(12) United States Patent
Hu et al.

(10) Patent No.: US 12,267,536 B2
(45) Date of Patent: Apr. 1, 2025

(54) ONLINE STREAMER IMAGE PICTURE TRANSMISSION IN LIVE INTERACTION

(71) Applicant: Shanghai Bilibili Technology Co., Ltd., Shanghai (CN)

(72) Inventors: Junhao Hu, Shanghai (CN); Huaizhou Zhang, Shanghai (CN); Jiangtao Hu, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 238 days.

(21) Appl. No.: 18/071,292

(22) Filed: Nov. 29, 2022

(65) Prior Publication Data

US 2023/0209108 A1 Jun. 29, 2023

(30) Foreign Application Priority Data

Dec. 27, 2021 (CN) .......................... 202111615504.0

(51) Int. Cl.
  *H04N 7/167* (2011.01)
  *H04N 21/2187* (2011.01)
  *H04N 21/235* (2011.01)

(52) U.S. Cl.
  CPC ..... *H04N 21/2351* (2013.01); *H04N 21/2187* (2013.01)

(58) Field of Classification Search
  CPC .................. H04N 21/2351; H04N 21/2187
  USPC ......................................................... 380/211
  See application file for complete search history.

(56) References Cited

U.S. PATENT DOCUMENTS

| 10,817,590 | B1 | 10/2020 | Daly et al. |
| 2003/0007639 | A1 | 1/2003 | Lambert |
| 2006/0013395 | A1 | 1/2006 | Brundage et al. |
| 2018/0165427 | A1* | 6/2018 | Verthein ............... H04L 65/403 |
| 2021/0360197 | A1 | 11/2021 | Oz et al. |
| 2021/0385506 | A1 | 12/2021 | Chen |
| 2023/0182028 | A1* | 6/2023 | Shen ..................... A63F 13/355 |
| | | | 463/42 |

FOREIGN PATENT DOCUMENTS

| CN | 107071584 A | 8/2017 |
| CN | 107330338 A | 11/2017 |
| CN | 108881664 A | 11/2018 |
| CN | 112929679 A | 6/2021 |
| CN | 113556223 A | 10/2021 |

* cited by examiner

*Primary Examiner* — William J. Goodchild
*Assistant Examiner* — Samuel Ambaye
(74) *Attorney, Agent, or Firm* — McAndrews, Held & Malloy, Ltd.

(57) ABSTRACT

This application provides an online streamer image picture transmission method and computing device in live interaction. The method applied to a server, the method includes: receiving an online streamer image picture sent by a first online streamer end, and obtaining a target obfuscation key; performing encryption processing on the online streamer image picture based on the target obfuscation key and picture information of the online streamer image picture, to obtain an encrypted online streamer image picture; and in response to determining that a live interaction request for the first online streamer end and a second online streamer end is received, sending the encrypted online streamer image picture and the target obfuscation key to the second online streamer end.

7 Claims, 5 Drawing Sheets

---

Receive an online streamer image picture sent by a first online streamer end, and obtain a target obfuscation key — 102

Perform encryption processing on the online streamer image picture based on the target obfuscation key and picture information of the online streamer image picture, to obtain an encrypted online streamer image picture — 104

In response to determining that a live interaction request for the first online streamer end and a second online streamer end is received, send the encrypted online streamer image picture and the target obfuscation key to the second online streamer end — 106

ONLINE STREAMER IMAGE PICTURE TRANSMISSION IN LIVE INTERACTION

CROSS-REFERENCE TO RELATED APPLICATION

The present application claims priority to Chinese Patent Application No. 202111615504.0, filed with the China National Intellectual Property Administration on Dec. 27, 2021, which is incorporated herein by reference in its entirety.

TECHNICAL FIELD

This application relates to the data processing field in the field of computer technologies, and in particular, to an online streamer image picture transmission method in live interaction. This application also relates to a computing device and a computer-readable storage medium.

BACKGROUND

With continuous development of computer technologies, livestreaming on a network social platform gradually becomes a popular form of real-time interaction. In the livestreaming field, more online streamers choose to perform livestreaming by using avatars, and livestreaming performed by online streamers by using avatars becomes a new content form in the livestreaming industry. In the livestreaming process, using avatars for interaction between online streamers produces beneficial and positive effects on livestreamed content, user attention to the online streamers, and the like.

SUMMARY

Embodiments of this application provide an online streamer image picture transmission method in live interaction. This application also relates to an online streamer image picture transmission apparatus in live interaction, a computing device, and a computer-readable storage medium.

According to a first aspect of the embodiments of this application, a method is provided, where the method is applied to a server, and includes:
receiving an online streamer image picture sent by a first online streamer end, and obtaining a target obfuscation key;
performing encryption processing on the online streamer image picture based on the target obfuscation key and picture information of the online streamer image picture, to obtain an encrypted online streamer image picture; and
in response to determining that a live interaction request for the first online streamer end and a second online streamer end is received, sending the encrypted online streamer image picture and the target obfuscation key to the second online streamer end.

According to a second aspect of the embodiments of this application, a method is provided, where the method is applied to a second online streamer end, and includes:
receiving an encrypted online streamer image picture and a target obfuscation key that are sent by a server, where the encrypted online streamer image picture is obtained by the sever by performing encryption processing on an online streamer image picture based on the target obfuscation key and picture information of the online streamer image picture sent by a first online streamer end;
generating, based on the target obfuscation key, a key picture corresponding to the encrypted online streamer image picture; and
performing decryption processing on the encrypted online streamer image picture based on the key picture, to obtain the online streamer image picture.

According to a third aspect of the embodiments of this application, a computing device is provided. The computing device is applied to a second online streamer end and includes: one or more processors; a memory storing one or more programs configured to be executed by the one or more processors, the one or more programs including instructions for: receiving an encrypted online streamer image picture and a target obfuscation key that are sent by a server, wherein the encrypted online streamer image picture is obtained by the sever by performing encryption processing on an online streamer image picture based on the target obfuscation key and picture information of the online streamer image picture sent by a first online streamer end; generating, based on the target obfuscation key, a key picture corresponding to the encrypted online streamer image picture; and performing decryption processing on the encrypted online streamer image picture based on the key picture, to obtain the online streamer image picture.

According to a fourth aspect of the embodiments of this application, a computing device is provided, including one or more processors; a memory storing one or more programs configured to be executed by the one or more processors, the one or more programs including instructions for implementing the steps of the above method.

According to a fifth aspect of the embodiments of this application, a non-transient computer-readable storage medium storing one or more programs is provided. The one or more programs includes instructions, which when executed by one or more processors of an electronic device, cause the electronic device to implement the steps of the above method.

DESCRIPTION OF EMBODIMENTS

Figure 1:
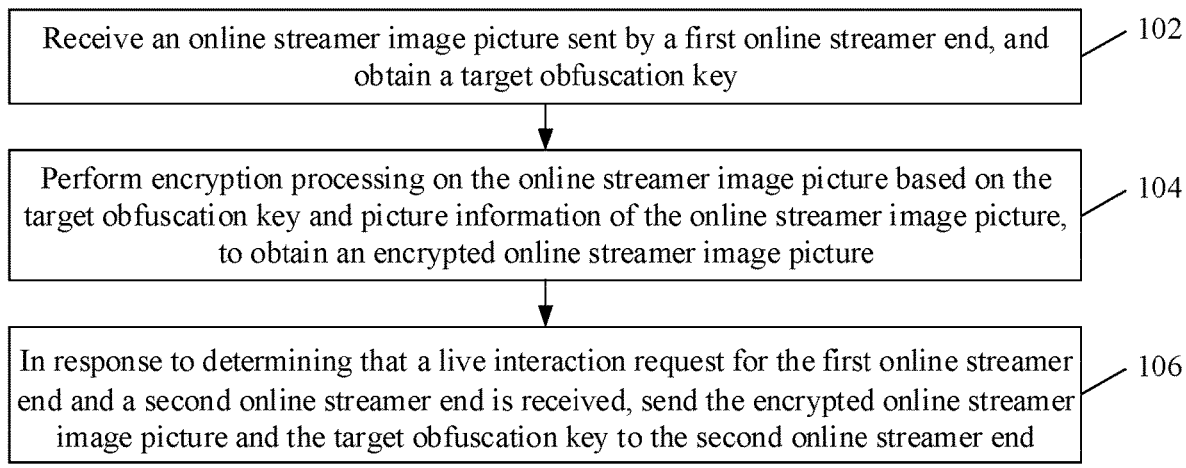
FIG. 1 is a flowchart of an online streamer image picture transmission method in live interaction according to an embodiment of this application.

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a", "said", and "the" of singular forms used in one or more embodiments and the appended claims of this application are also intended to include plural forms, unless otherwise specified in the context clearly. It should also be understood that, the term "and/or" used in one or more embodiments of this specification indicates and includes any or all possible combinations of one or more associated listed items.

It should be understood that although terms such as "first" and "second" can be used in one or more embodiments of this application to describe various types of information, the information is not limited to these terms. These terms are only used to differentiate between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

First, nouns related to one or more embodiments of this application are explained.

An intellectual property (IP) image, namely, an IP image, is commonly known as an Internet IP image, and includes three parts: copyrights, patents, and trademarks.

A model texture mapping resource of an avatar is a picture resource used for an avatar model.

An exclusive OR algorithm, namely, an XOR algorithm, is a type of logic analysis on two operands.

An RGBA value represents four values such as transparency (A, Alpha), red (R), green (G), and blue (B) of a picture.

An RGB value represents three values such as red (R), green (G) and blue (B) of a picture.

Then, an online streamer image picture transmission method in live interaction provided in this application is described.

Currently, that an online streamer performs livestreaming by using an avatar becomes a novel content form in the competitive live industry. In a livestreaming process, interaction between a plurality of online streamers may bring a positive effect of 1+1>2 to content. This has strong boost to both content ecology and a revenue capacity of the online streamer. In a virtual service, an interaction manner such as co-hosting and PK between both friends and virtual groups (or guilds) is greatly favored by the online streamer. However, currently, because privacy (the avatar needs to be downloaded in most cases), a technology implementation difficulty, and costs of the avatar are in the hands of the guild, a co-hosting capability cannot be well assigned to more top and medium/long-tail online streamers. After online streamers are successfully connected to each other for interaction, avatar resources of the interaction parties need to be downloaded, in other words, a plurality of online streamers need to exchange respective avatars with each other, which is risky. That is, the largest disadvantage of localizing the avatar is that the security of the avatar of the online streamer is low, and the avatar is susceptible to leakage and is likely to be stolen by other users, impairing rights and interests of the online streamer.

Specifically, in terms of technology, an avatar localization solution is mainly used for interaction between online streamers: After an interaction connection succeeds, the online streamer downloads an avatar resource of an interaction object, performs facial motion capture, and the like. Data is synchronized by using a signaling transmission link, to reduce video streaming traffic and ensure definition. Later expansibility is high and compatibility is good. However, in the foregoing method, an IP image of the online streamer is easily leaked. Consequently, the IP image of the online streamer is easily stolen by an unauthorized user, and rights and interests of an owner of the IP image are compromised.

Therefore, this application provides an online streamer image picture transmission method in live interaction. An online streamer image picture sent by a first online streamer end is received, and a target obfuscation key is obtained; encryption processing is performed on the online streamer image picture based on the target obfuscation key and picture information of the online streamer image picture, to obtain an encrypted online streamer image picture; and if a live interaction request for the first online streamer end and a second online streamer end is received, the encrypted online streamer image picture is sent to the second online streamer end. Encryption processing is performed on the online streamer image picture by using the target obfuscation key and the picture information of the online streamer image picture, so that all online streamer image pictures stored in a memory are encrypted. This ensures that the online streamer image picture in the memory is not obtained and is securely used at the second online streamer end, effectively reduces a risk of leaking the online streamer image picture, and improves security of transmitting the online streamer image picture. Before receiving the live interaction request, the server completes encryption of the online streamer image picture. In this way, instead of performing encryption after receiving the live interaction request, the server may send the encrypted online streamer image picture to the second online streamer end in a timely manner after receiving the live interaction request. Therefore, response efficiency of the second online streamer end can be improved, and an effect of responding in a timely manner can be achieved for livestreaming. In addition, instead of performing encryption after receiving the live interaction request, the server performs encryption after receiving the online streamer image picture of the first online streamer. This may provide sufficient time for an encryption process, to perform encryption by selecting a target obfuscation key with a high encryption degree, so as to improve a difficulty of decrypting the encrypted online streamer image picture. Therefore, this further reduces a risk of leaking the online streamer image picture, and improves security of transmitting the online streamer image picture. In addition, the method provided in this application is easy to apply, to reduce transformation costs of each client.

This application provides an online streamer image picture transmission method in live interaction. This application also relates to an online streamer image picture transmission apparatus in live interaction, a computing device, and a computer-readable storage medium. Details are described one by one in the following embodiments.

FIG. 1 is a flowchart of an online streamer image picture transmission method in live interaction according to an embodiment of this application. The method is applied to a server, and specifically includes the following steps:

Step 102: Receive an online streamer image picture sent by a first online streamer end, and obtain a target obfuscation key.

Specifically, an online streamer, namely, an online live streamer, is a person who is responsible for a series of tasks such as planning, editing, recording, production, and audience interaction in an Internet program or activity, and serves as a host. A first online streamer is any online streamer. In some embodiments, the first online streamer is any online streamer who performs livestreaming by using an avatar or an image of an unreal person. The first online streamer end is a client on which the first online streamer is located, and may be any intelligent device such as a mobile phone, a tablet computer, and an intelligent computer. The online streamer image picture is a picture resource used when an avatar of an online streamer is constructed, namely, a model texture mapping resource of the avatar. Obfuscation is an encryption operation that enables a relationship between a key and a ciphertext (online streamer image picture) to be as obfuscated as possible. The target obfuscation key is a key corresponding to obfuscation, and may be a string such as a combination of at least one of a number, a letter, and a symbol, or may be in a form of a matrix or an array.

In actual application, when an online streamer selects, in an online streamer image picture upload interface by using a client on which the online streamer is located, namely, an online streamer end, an online streamer image picture that needs to be uploaded by the online streamer and that is used to construct an avatar of the online streamer, after the online streamer clicks a key "OK" or any key that indicates upload confirmation, the online streamer end sends the online streamer image picture to the server, that is, the first online streamer end sends the online streamer image picture to the server, in other words, the server receives the online streamer image picture sent by the first online streamer end. Further, to ensure security when the online streamer image picture is sent to another online streamer end, namely, another online streamer end, the server needs to encrypt the online streamer image picture. Therefore, a key for encrypting the online streamer image picture may be obtained first, namely, the target obfuscation key.

For example, a game online streamer selects, from a local database by using an upload interface of a live platform, an online streamer image picture XX corresponding to an avatar that the game online streamer expects to display, then uploads the online streamer image picture XX to the upload interface, and clicks a key "OK" for confirming uploading. The live platform uploads the online streamer image picture XX to the server. Then, the server obtain a target obfuscation key, to encrypt the online streamer image picture XX.

It should be noted that the first online streamer may further send, to the server by using the first online streamer end, an online streamer image model file that needs to be uploaded by the first online streamer and that is used to construct the online streamer image. The image model file includes the online streamer image picture and an online streamer image model. The online streamer image model may be two-dimensional or three-dimensional. This is not limited in this application. The server may first receive the online streamer image model file sent by the first online streamer end, then may obtain the online streamer image picture from the online streamer image model file, then obtain the target obfuscation key, and record a correspondence between the target obfuscation key and the online streamer image picture, that is, the target obfuscation key uniquely corresponds to the online streamer image picture.

To improve security of the target obfuscation key, the server may first obtain an initial obfuscation key, and then convert the initial obfuscation key to obtain the target obfuscation key. In other words, a specific implementation process of obtaining the target obfuscation key may be as follows:

obtaining an initial obfuscation key; and performing preset bitwise operation processing on the initial obfuscation key to obtain the target obfuscation key.

Specifically, the initial obfuscation key is an obfuscation key that is directly obtained by the server and on which no processing is performed. Bitwise operation processing is a process of directly operating a number in a binary form, for example, a bitwise AND operation, bitwise OR operation, a leftward shift operation, and a rightward shift operation. Preset bitwise operation processing means performing preset bitwise operation processing on a number in a binary form corresponding to the initial obfuscation key.

In actual application, the server may first randomly generate an initial obfuscation key. The initial obfuscation key that is randomly generated may be obtained from a memory of the server, and data exists in a binary form on a computer (a server or an online streamer end). Therefore, to ensure security of an obfuscation key and increase a decryption difficulty, preset bitwise operation processing needs to be performed on the obtained initial obfuscation key, to obtain a target obfuscation key.

For example, if the initial obfuscation key randomly generated by the server is 11, a binary form corresponding to 11 is 1011, and preset bitwise operation processing is bitwise NOT processing. In this case, 1011 becomes 0100, and a number corresponding to 0100 is 4, that is, the target obfuscation key is 4.

To further improve security of the target obfuscation key to improve security of transmitting the online streamer image picture, randomization processing may be performed on each bit in the initial obfuscation key. In other words, a specific implementation process of performing preset bitwise operation processing on the initial obfuscation key to obtain the target obfuscation key may be as follows:

for any bit in the initial obfuscation key, performing randomization processing on a value of the bit by using a preset random algorithm, to obtain a new value of the bit; and generating the target obfuscation key based on a new value of each bit.

Specifically, when the initial obfuscation key is in a form of a string, any bit in the initial obfuscation key is any character in the string. When the initial obfuscation key is a matrix or an array, any bit in the initial obfuscation key is any element in the matrix or the array. A random algorithm means that a random function is used in the algorithm, and a return value of the random function directly or indirectly affects an execution process or an execution result of the algorithm. The random algorithm is based on a random method, and depends on a probability.

In actual application, after the initial obfuscation key is obtained, randomization processing may be performed on a value of each bit in the initial obfuscation key by using the preset random algorithm, to obtain a new value corresponding to each bit in the initial obfuscation key.

For example, if the initial obfuscation key is a string "1234567", randomization processing may be performed on each of 1, 2, 3, 4, 5, 6, and 7 by using the preset random algorithm, to obtain a new value corresponding to each of 1, 2, 3, 4, 5, 6, and 7. Then, the new value corresponding to 1, the new value corresponding to 2, the new value corresponding to 3, the new value corresponding to 4, the new value corresponding to 5, the new value corresponding to 6, and the new value corresponding to 7 are combined to obtain the target obfuscation key.

For example, if the initial obfuscation key is an array "12, 8, 22, and 50", randomization processing may be performed on each of 12, 8, 22, and 50 by using the preset random algorithm, to obtain a new value corresponding to each of 12, 8, 22, and 50. Then, the new value corresponding to 12, the new value corresponding to 8, the new value corresponding to 22, and the new value corresponding to 50 are combined to obtain the target obfuscation key.

It should be noted that, after the initial obfuscation key is obtained, values of the first bit to the last bit in the initial obfuscation key may be recorded in an index table (key_array_index) based on a sequence. Then, the first value is first obtained from the index table, and then randomization processing is performed on the value by using the preset random algorithm, to obtain a new value corresponding to the first bit in the initial obfuscation key. For specific randomization, refer to Formula (1). Next, the second value is first obtained from the index table, and then randomization is performed on the value by using the preset random algorithm, to obtain a new value corresponding to the second bit in the initial obfuscation key. A similar process is executed, until a new value corresponding to the last bit in the initial obfuscation key is obtained.

$$F_{(k)} = \text{Function}(f_{(k)}) \qquad \text{(Formula 1)}$$

In Formula (1), k is a positive integer, $F_{(k)}$ represents a new value corresponding to a kth bit in the initial obfuscation key, $f_{(k)}$ represents a value corresponding to the kth bit in the initial obfuscation key, and Function represents randomization processing.

In some embodiments, randomization processing may be randomization processing for a bitwise operation.

Step 104: Perform encryption processing on the online streamer image picture based on the target obfuscation key and picture information of the online streamer image picture, to obtain an encrypted online streamer image picture.

On the basis of receiving the online streamer image picture and obtaining the target obfuscation key, further, encryption processing is performed on the online streamer image picture based on the target obfuscation key and the picture information of the online streamer image picture, to obtain the encrypted online streamer image picture.

Specifically, the picture information, namely, picture data or image data, is a data set that represents a picture, for example, a color value of a pixel, a quantity of pixels, and a size of a picture. Encryption processing is a process of changing original information data by using a special algorithm, and may be an exclusive OR encryption algorithm, a bit shift encryption algorithm, an AND/OR algorithm, and the like.

In actual application, the server may first read the picture information of the online streamer image picture, and then perform encryption processing on the online streamer image picture based on the target obfuscation key, that is, perform encryption processing on the picture information of the online streamer image picture based on the target obfuscation key, to obtain the encrypted online streamer image picture corresponding to the online streamer image picture.

In some embodiments, the picture information includes a color value of each pixel in the online streamer image picture. Encryption processing may be performed on the color value of each pixel in the online streamer image picture, to implement encryption processing on the online streamer image picture. In other words, a specific implementation process of performing encryption processing on the online streamer image picture based on the target obfuscation key and the picture information of the online streamer image picture, to obtain the encrypted online streamer image picture may be as follows:

performing encryption processing on the color value of each pixel based on the target obfuscation key, to obtain an encrypted color value of each pixel; and generating the encrypted online streamer image picture based on each encrypted color value.

Specifically, the pixel is a most basic unit element that forms the online streamer image picture, and each pixel has a specific location and a color value allocated to the pixel. The color value may be a value corresponding to color when the pixel is displayed, for example, an ARGB value and an RGB value.

In actual application, the color value of each pixel in the online streamer image picture may be obtained, and then encryption processing is performed on the color value of each pixel based on the target obfuscation key. After the color values of all the pixels are encrypted, the encrypted online streamer image picture is obtained based on the encrypted color value of each pixel. In this way, the color value of each pixel in the online streamer image picture is encrypted. This can improve a difference between the encrypted online streamer image picture and the online streamer image picture, to improve security of the online streamer image picture in a transmission process.

For example, the target obfuscation key is "1, 2, 3, 4", the online streamer image picture has four pixels, a color value of the first pixel is 6, a color value of the second pixel is 3, a color value of the third pixel is 11, and a color value of the fourth pixel is 7. If encryption processing is an AND operation, the AND operation is performed on the color value 6(0110) of the first pixel and a value 1(0001) of the first bit in the target obfuscation key, and an encrypted color value is 0(0000); the AND operation is performed on the color value 3(0011) of the second pixel and a value 2(0010) of the second bit in the target obfuscation key, and an encrypted color value is 1(0010); the AND operation is performed on the color value 11(1011) of the third pixel and a value 3(0011) of the third bit in the target obfuscation key, and an encrypted color value is 3(0011); and the AND operation is performed on the color value 7(0111) of the fourth pixel and a value 4(0100) of the fourth bit in the target obfuscation key, and an encrypted color value is 4(0100). Then, the encrypted online streamer image picture is generated based on the encrypted color value 0, the encrypted color value 1, the encrypted color value 3, and the encrypted color value 4, that is, color values of four pixels of the encrypted online streamer image picture are respectively 0, 1, 3, and 4.

Figure 2:
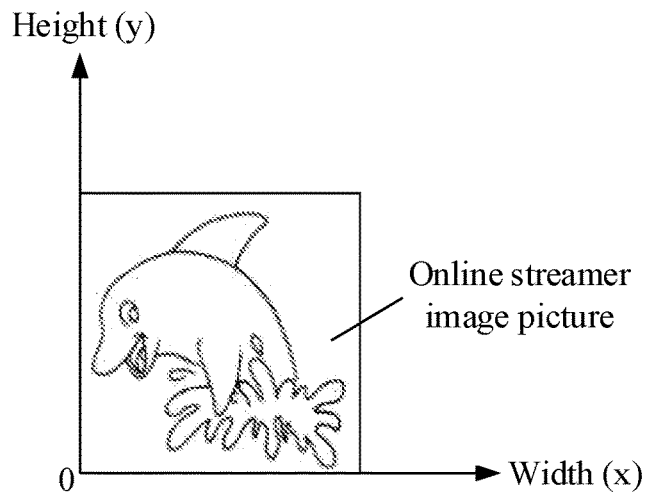
FIG. 2 is a schematic diagram of selecting a pixel in an online streamer image picture in an online streamer image picture transmission method in live interaction according to an embodiment of this application.

FIG. 2 is a schematic diagram of selecting a pixel in an online streamer image picture in an online streamer image picture transmission in live interaction according to an embodiment of this application. A Cartesian coordinate system is established by using a vertex at a lower left corner of the online streamer image picture as the origin, a horizontal rightward direction as the x-axis, and a vertical upward direction as the y-axis, and $P_{xy}$ represents each pixel in the online streamer image picture. Based on different values of x and y, all pixels in the online streamer image picture may be obtained.

In some embodiments, the color value may include transparency and a chrominance value. Therefore, when the color value is encrypted, the transparency and the chrominance value may be separately encrypted. In other words, when the color value includes the transparency and the chrominance value, a specific implementation process of performing encryption processing on the color value of each pixel based on the target obfuscation key, to obtain the encrypted color value of each pixel may be as follows:

starting from an $i^{th}$ pixel in the online streamer image picture, performing an exclusive OR operation on transparency of the $i^{th}$ pixel in the online streamer image picture and a value of a $(2i-1)^{th}$ bit in the target obfuscation key to obtain encrypted transparency of the $i^{th}$ pixel, where i=1;

performing an exclusive OR operation on a chrominance value of the $i^{th}$ pixel in the online streamer image picture and a value of a $(2i)^{th}$ bit in the target obfuscation key to obtain an encrypted chrominance value of the $i^{th}$ pixel;

obtaining an encrypted color value of the $i^{th}$ pixel based on the encrypted transparency and the encrypted chrominance value of the $i^{th}$ pixel;

determining whether the $i^{th}$ pixel in the online streamer image picture is the last pixel; and if the $i^{th}$ pixel in the online streamer image picture is not the last pixel, increasing i by 1, and returning to the step of performing an exclusive OR operation on transparency of the $i^{th}$ pixel in the online streamer image picture and a value of a $(2i-1)^{th}$ bit in the target obfuscation key.

Specifically, the transparency is used to indicate a transparency degree of a pixel, and higher transparency indicates a more transparent pixel. The chrominance value is a value corresponding to color when a pixel is displayed, for example, an RGB value.

In actual application, first, the first pixel in the online streamer image picture may be selected. Next, transparency and a chrominance value of the first pixel are determined. Then, the exclusive OR operation is performed on a value of the first bit in the target obfuscation key and the transparency of the first pixel to obtain encrypted transparency of the first pixel. The exclusive OR operation is performed on a value of the second bit in the target obfuscation key and the chrominance value of the first pixel to obtain an encrypted chrominance value of the first pixel. An encrypted color value of the first pixel is obtained based on the encrypted transparency and the encrypted chrominance value of the first pixel. Then, the second pixel in the online streamer image picture is selected. Next, transparency and a chrominance value of the second pixel are determined. Then, the exclusive OR operation is performed on a value of the third bit in the target obfuscation key and the transparency of the second pixel to obtain encrypted transparency of the second pixel. The exclusive OR operation is performed on a value of the fourth bit in the target obfuscation key and the chrominance value of the second pixel to obtain an encrypted chrominance value of the second pixel. An encrypted color value of the second pixel is obtained based on the encrypted transparency and the encrypted chrominance value of the second pixel. A similar process is executed, until an encrypted color value of the last pixel in the online streamer image picture is determined. In this way, in a manner of encrypting the transparency and the chrominance value, the online streamer image picture can be encrypted at a finer granularity. This further improves a difference between the encrypted online streamer image picture and the online streamer image picture, and improves security of the online streamer image picture in a transmission process.

For example, the target obfuscation key is "15, 13, 8, 1", the online streamer image picture has two pixels, transparency of the first pixel is 11, a chrominance value thereof is 13, transparency of the second pixel is 7, and a chrominance value thereof is 9. In this case, the exclusive OR operation is performed on the transparency 11(1011) of the first pixel and the value 15(1111) of the first bit in the target obfuscation key, and encrypted transparency of the first pixel is 4(0100). The exclusive OR operation is performed on the chrominance value 13(1101) of the first pixel and the value 13(1101) of the second bit in the target obfuscation key, and an encrypted color value of the first pixel is 0(0000). Then, an encrypted chrominance value of the first pixel is obtained based on the encrypted transparency 4 and the encrypted chrominance value 0 of the first pixel. Next, the exclusive OR operation is performed on the transparency 7(0111) of the second pixel and the value 8(1000) of the third bit in the target obfuscation key, and encrypted transparency of the second pixel is 15(1111). The exclusive OR operation is performed on the chrominance value 9(1001) of the second pixel and the value 1(0001) of the fourth bit in the target obfuscation key, and an encrypted chrominance value of the second pixel is 14(1110). Then, an encrypted color value of the second pixel is obtained based on the encrypted transparency 15 and the encrypted chrominance value 14 of the second pixel.

In some embodiments, the color value may include transparency, a first chrominance value, a second chrominance value, and a third chrominance value. Therefore, when the color value is encrypted, the transparency, the first chrominance value, the second chrominance value, and the third chrominance value may be separately encrypted. In other words, when the color value includes the transparency, the first chrominance value, the second chrominance value, and the third chrominance value, a specific implementation process of performing encryption processing on the color value of each pixel based on the target obfuscation key, to obtain the encrypted color value of each pixel may be as follows:

starting from a $j^{th}$ pixel in the online streamer image picture, performing an exclusive OR operation on transparency of the $j^{th}$ pixel in the online streamer image picture and a value of a $(4j-3)^{th}$ bit in the target obfuscation key to obtain encrypted transparency of the $j^{th}$ pixel, where j=1;

performing an exclusive OR operation on a first chrominance value of the $j^{th}$ pixel in the online streamer image picture and a value of a $(4j-2)^{th}$ bit in the target obfuscation key to obtain an encrypted first chrominance value of the $i^{th}$ pixel;

performing an exclusive OR operation on a second chrominance value of the $j^{th}$ pixel in the online streamer image picture and a value of a $(4j-1)^{th}$ bit in the target obfuscation key to obtain an encrypted second chrominance value of the $j^{th}$ pixel;

performing an exclusive OR operation on a third chrominance value of the $j^{th}$ pixel in the online streamer image picture and a value of a $(4j)^{th}$ bit in the target obfuscation key to obtain an encrypted third chrominance value of the $j^{th}$ pixel;

obtaining an encrypted color value of the $j^{th}$ pixel based on the encrypted transparency, the encrypted first chrominance value, the encrypted second chrominance value, and the encrypted third chrominance value of the $j^{th}$ pixel;

determining whether the $j^{th}$ pixel in the online streamer image picture is the last pixel; and if the $j^{th}$ pixel in the online streamer image picture is not the last pixel, increasing j by 1, and returning to the step of performing an exclusive OR operation on transparency of the $j^{th}$ pixel in the online streamer image picture and a value of a $(4j-1)^{th}$ bit in the target obfuscation key.

Specifically, the transparency is used to indicate a transparency degree of a pixel, and higher transparency indicates a more transparent pixel. The first chrominance value, the second chrominance value, and the third chrominance value are values respectively corresponding to red, green, and blue when a pixel is displayed, that is, the first chrominance value, the second chrominance value, and the third chrominance value are respectively an R value, a G value, and a B value.

In actual application, first, the first pixel in the online streamer image picture may be selected. Next, transparency, a first chrominance value, a second chrominance value, and a third chrominance value of the first pixel are determined. Then, the exclusive OR operation is performed on a value of the first bit in the target obfuscation key and the transparency of the first pixel to obtain encrypted transparency of the first pixel. The exclusive OR operation is performed on a value of the second bit in the target obfuscation key and the first chrominance value of the first pixel to obtain an encrypted first chrominance value of the first pixel. The exclusive OR operation is performed on a value of the third bit in the target obfuscation key and the second chrominance value of the first pixel to obtain an encrypted second chrominance value of the first pixel. The exclusive OR operation is performed on a value of the fourth bit in the target obfuscation key and the third chrominance value of the first pixel to obtain an encrypted third chrominance value of the first pixel. Then, an encrypted color value of the first pixel is obtained based on the encrypted transparency, the encrypted first chrominance value, the encrypted second chrominance value, and the encrypted third chrominance value of the first pixel. Then, the second pixel in the online streamer image picture is selected. Next, transparency, a first chrominance value, a second chrominance value, and a third chrominance value of the second pixel are determined. Then, the exclusive OR operation is performed on a value of the fifth bit in the target obfuscation key and the transparency of the second pixel to obtain encrypted transparency of the second pixel. The exclusive OR operation is performed on a value of the sixth bit in the target obfuscation key and the first chrominance value of the second pixel to obtain an encrypted first chrominance value of the second pixel. The exclusive OR operation is performed on a value of the seventh bit in the target obfuscation key and the second chrominance value of the second pixel to obtain an encrypted second chrominance value of the second pixel. The exclusive OR operation is performed on a value of the eighth bit in the target obfuscation key and the third chrominance value of the second pixel to obtain an encrypted third chrominance value of the second pixel. Then, an encrypted color value of the second pixel is obtained based on the encrypted transparency, the encrypted first chrominance value, the encrypted second chrominance value, and the encrypted third chrominance value of the second pixel. A similar process is executed, until an encrypted color value of the last pixel in the online streamer image picture is determined. For details, refer to Formula (2). In this way, in a manner of encrypting the transparency, the first chrominance value, the second chrominance value, and the third chrominance value, the online streamer image picture can be encrypted at a finer granularity. This further improves a difference between the encrypted online streamer image picture and the online streamer image picture, and improves security of the online streamer image picture in a transmission process.

$$P_j(A)=Q_j(A)\char"5E F_{(4j-3)}$$

$$P_j(R)=Q_j(R)\char"5E F_{(4j-2)}$$

$$P_j(G)=Q_j(G)\char"5E F_{(4j-1)}$$

$$P_j(B)=Q_j(B)\char"5E F_{(4j)}$$

$$P_j(ARGB)=(P_j(A),P_j(R),P_j(G),P_j(B)) \quad \text{(Formula 2)}$$

In Formula 2, j is any positive integer, $P_j(A)$ is the encrypted transparency of the $j^{th}$ pixel, $Q_j(A)$ is the transparency of the $j^{th}$ pixel, $F_{(4j-3)}$ is the value of the $(4j-3)^{th}$ bit in the target obfuscation key, $P_j(R)$ is the encrypted first chrominance value of the $j^{th}$ pixel, $Q_j(R)$ is the first chrominance value of the $j^{th}$ pixel, $F_{(4j-2)}$ is the value of the $(4j-2)^{th}$ bit in the target obfuscation key, $P_j(G)$ is the encrypted second chrominance value of the $j^{th}$ pixel, $Q_j(G)$ is the second chrominance value of the $j^{th}$ pixel, $F_{(4j-1)}$ is the value of the $(4j-1)^{th}$ bit in the target obfuscation key, $P_j(B)$ is the encrypted third chrominance value of the $j^{th}$ pixel, $Q_j(B)$ is the third chrominance value of the $j^{th}$ pixel, $F_{(4j)}$ is the value of the $(4j)^{th}$ bit in the target obfuscation key, and $P_j(ARGB)$ is the encrypted color value of the $j^{th}$ pixel.

For example, the target obfuscation key is "15, 13, 8, 1, 1, 2, 3, 4", online streamer image picture has two pixels, transparency of the first pixel is 11, a first chrominance value thereof is 13, a second chrominance value thereof is 7, a third chrominance value thereof is 9, transparency of the second pixel is 7, a first chrominance value thereof is 9, a second chrominance value thereof is 5, and a third chrominance value thereof is 6. The exclusive OR operation is performed on the transparency 11(1011) of the first pixel and a value 15(1111) of the first bit in the target obfuscation key, and encrypted transparency of the first pixel is 4(0100). The exclusive OR operation is performed on the first chrominance value 13 (1101) of the first pixel and a value 13(1101) of the second bit in the target obfuscation key, and an encrypted first chrominance value of the first pixel is 0(0000). The exclusive OR operation is performed on the second chrominance value 7(0111) of the first pixel and a value 8(1000) of the third bit in the target obfuscation key, and an encrypted second chrominance value of the first pixel is 15(1111). The exclusive OR operation is performed on the third chrominance value 9(1001) of the first pixel and a value of the fourth bit 1(0001) in the target obfuscation key, and an encrypted third chrominance value of the first pixel is 14(1110). Then, an encrypted color value of the first pixel is obtained based on the encrypted transparency 4, the encrypted first chrominance value 0, the encrypted second chrominance value 15, and the encrypted third chrominance value 14 of the first pixel. Then, the exclusive OR operation is performed on the transparency 7(0111) of the second pixel and a value 1(0001) of the fifth bit in the target obfuscation key, and encrypted transparency of the second pixel is 14(1110). The exclusive OR operation is performed on the first chrominance value 9(1001) of the second pixel and a value 2(0010) of the sixth bit in the target obfuscation key, and an encrypted first chrominance value of the second pixel is 10(1010). The exclusive OR operation is performed on the second chrominance value 5(0101) of the second pixel and a value 3(0011) of the seventh bit in the target obfuscation key, and an encrypted second chrominance value of the second pixel is 6(0110). The exclusive OR operation is performed on the third chrominance value 6(0110) of the second pixel and a value 4 (0100) of the eighth bit in the target obfuscation key, and an encrypted third chrominance value of the second pixel is 2(0010). Then, an encrypted color value of the second pixel is obtained based on the encrypted transparency 14, the encrypted first chrominance value 10, the encrypted second chrominance value 6, and the encrypted third chrominance value 2 of the second pixel.

Figure 3:
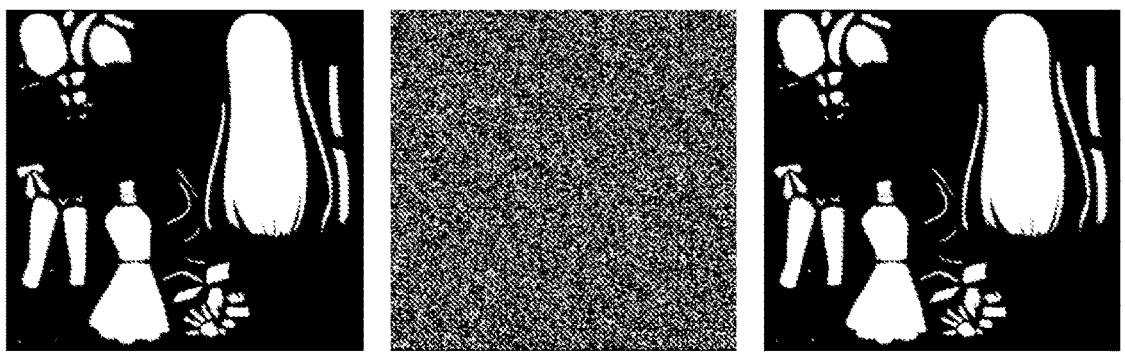
FIG. 3 is a schematic diagram of an effect of encrypting an online streamer image picture in an online streamer image picture transmission method in live interaction according to an embodiment of this application.

FIG. 3 is a schematic diagram of an effect of encrypting an online streamer image picture in an online streamer image picture transmission method in live interaction according to an embodiment of this application. An online streamer image picture before encryption is the online streamer image picture of the first online streamer. After the online streamer image picture is encrypted, the encrypted online streamer image picture is obtained, and the encrypted online streamer image picture is totally different from the online streamer image picture before encryption.

It should be noted that, because there is a large quantity of pixels in the online streamer image picture, when the color value of the pixel is encrypted, if values of bits in the target obfuscation key need to be in a one-to-one correspondence with transparency and chrominance values of pixels, or values of bits in the target obfuscation key need to be in a one-to-one correspondence with transparency, first chrominance values, second chrominance values, and third chrominance values of pixels, the target obfuscation key is extremely complex and large. This increases a data processing amount of the server for the target obfuscation key. Therefore, to reduce the data processing amount of the server, the value of each bit in the target obfuscation key may be used cyclically. In other words, when encryption of the color value of the pixel is not completed, the value of the last bit in the target obfuscation key has been obtained. In this case, when a next value is obtained, the value of the first bit in the target obfuscation key may continue to be obtained, and so on.

For example, the target obfuscation key is "1, 2, 3, 4", the online streamer image picture includes four pixels, and the color value includes transparency and a chrominance value. In this case, the exclusive OR operation is performed on the transparency of the first pixel and "1", and the chrominance value of the first pixel and "2". The exclusive OR operation is performed on the transparency of the second pixel and "3", and the chrominance value of the second pixel and "4". The exclusive OR operation is performed on the transparency of the third pixel and "1", and the chrominance value of the third pixel and "2". The exclusive OR operation is performed on the transparency of the fourth pixel and "3", and the chrominance value of the fourth pixel and "4".

For another example, the target obfuscation key is "1, 2, 3, 4, 5, 6", the online streamer image picture includes four pixels, and the color value includes a transparency value, a first chrominance value, a second chrominance value, and a third chrominance value. In this case, the exclusive OR operation is performed on the transparency of the first pixel and "1", the first chrominance value of the first pixel and "2", the second chrominance value of the first pixel and "3", and the third chrominance value of the first pixel and "4". The exclusive OR operation is performed on the transparency of the second pixel and "5", the first chrominance value of the second pixel and "6", the second chrominance value of the second pixel and "1", and the third chrominance value of the second pixel and "2". The exclusive OR operation is performed on the transparency of the third pixel and "5", the first chrominance value of the third pixel and "6", the second chrominance value of the third pixel and "1", and the third chrominance value of the third pixel and "2". The exclusive OR operation is performed on the transparency of the fourth pixel and "3", the first chrominance value of the fourth pixel and "4", the second chrominance value of the fourth pixel and "5", and the third chrominance value of the fourth pixel and "6".

Step 106: If a live interaction request for the first online streamer end and a second online streamer end is received, send the encrypted online streamer image picture and the target obfuscation key to the second online streamer end.

On the basis of performing encryption processing on the online streamer image picture based on the target obfuscation key and the picture information of the online streamer image picture, to obtain the encrypted online streamer image picture, further, when the live interaction request for the first online streamer end and the second online streamer end is received, the encrypted online streamer image picture is sent to the second online streamer end.

Specifically, the live interaction request is a request generated based on a requirement of interaction between two online streamers during livestreaming. The live interaction request may be a co-hosting request, or may be a player killing (PK) request. It should be noted that there may be only one online streamer who interacts with the first online streamer, or may be a plurality of online streamers who interact with the first online streamer. When there are a plurality of online streamers who interact with the first online streamer, a second online streamer is any one of the online streamers who interact with the first online streamer. For example, the first online streamer is an online streamer A1, four online streamers such as the online streamer A1, an online streamer A2, an online streamer A3, and an online streamer A4 interact with each other, and the second online streamer may be any one of the online streamer A2, the online streamer A3, and the online streamer A4. The second online streamer is an online streamer who interacts with the first online streamer. An online streamer identifier may be an online streamer name, or may be an online streamer identity document (ID), namely, a sequence number or an account number. This is not limited in this application. The second online streamer end is a client associated with the second online streamer, namely, an online streamer end corresponding to the second online streamer.

In actual application, after the server receives a request that is sent by the first online streamer and that is used to perform live interaction with the second online streamer, or receives a request that is sent by the second online streamer and that is used to perform live interaction with the first online streamer, that is, after the server receives the live interaction request for the first online streamer end and the second online streamer end, the server sends the encrypted online streamer image picture of the first online streamer and the target obfuscation key to the second online streamer end based on the live interaction request.

In addition, the live interaction request may carry an online streamer identifier of the second online streamer. In this way, the server may determine, based on the online streamer identifier of the second online streamer in the live interaction request, the second online streamer end corresponding to the second online streamer, and send the encrypted online streamer image picture and the target obfuscation key to the second online streamer end. Then, the second online streamer end decrypts the encrypted online streamer image picture based on the target obfuscation key to obtain the online streamer image picture of the first online streamer, and then renders an image of the first online streamer at the second online streamer end based on the online streamer image picture of the first online streamer.

FIG. 3 is a schematic diagram of an effect of encrypting an online streamer image picture in an online streamer image picture transmission method in live interaction according to an embodiment of this application. An online streamer image picture before encryption is the online streamer image picture of the first online streamer. After the online streamer image picture is encrypted, the encrypted online streamer image picture is obtained, and the encrypted online streamer image picture is totally different from the online streamer image picture before encryption. After the encrypted online streamer image picture is decrypted, a decrypted online streamer image picture is obtained. The decrypted online streamer image picture is the same as the online streamer image picture before encryption, and both are the online streamer image picture of the first online streamer.

It should be noted that, to ensure security of transmitting the online streamer image picture, the server sends the encrypted online streamer image picture and the target obfuscation key to the second online streamer end two times: First, when receiving the live interaction request for the first online streamer end and the second online streamer end, the server sends, based on the online streamer identifier of the second online streamer in the live interaction request, the encrypted online streamer image picture to the second online streamer end associated with the second online streamer. Then, after receiving the encrypted online streamer image picture, the second online streamer end requests the target obfuscation key from the server. In this case, the server sends the target obfuscation key to the second online streamer end. Before sending the target obfuscation key to the second online streamer end, the server further needs to record file use information of the second online streamer end. The file use information includes at least one of a user identifier, a use scenario, a use range, a used file identifier, and a use time that correspond to the second online streamer end. In this way, traceability of use of the target obfuscation key can be implemented, and a leakage path can be traced, to provide clues and data support for recovery after an unfortunate loss.

In addition, after receiving the target obfuscation key, the second online streamer end may directly generate a key picture based on the target obfuscation key, and then obtain the online streamer image picture of the first online streamer based on the key picture and the encrypted online streamer image picture. Alternatively, the second online streamer end may directly decrypt the encrypted online streamer image picture based on the target obfuscation key, to obtain the online streamer image picture of the first online streamer.

It should be noted that, after obtaining the online streamer image picture of the first online streamer, the second online streamer end needs to render an image of the first online streamer at the second online streamer end based on the online streamer image picture, generates, based on an image of the second online streamer, an interaction video stream in which the first online streamer interacts with the second online streamer, and then pushes the interaction video stream to the server. After receiving the interaction video stream, the server determines an audience identifier corresponding to the second online streamer, that is, determines an audience watching the second online streamer, and then sends the interaction video stream to an audience client on which the audience of the second online streamer is located, so that the audience client displays, based on the interaction video stream, a picture in which the first online streamer interacts with the second online streamer.

In the online streamer image picture transmission method in live interaction provided in this application, the online streamer image picture sent by the first online streamer end is received, and the target obfuscation key is obtained; encryption processing is performed on the online streamer image picture based on the target obfuscation key and the picture information of the online streamer image picture, to obtain the encrypted online streamer image picture; and if the live interaction request for the first online streamer end and the second online streamer end is received, the encrypted online streamer image picture and the target obfuscation key are sent to the second online streamer end. Encryption processing is performed on the online streamer image picture by using the target obfuscation key and the picture information of the online streamer image picture, so that all online streamer image pictures stored in a memory are encrypted. This ensures that the online streamer image picture in the memory is not obtained and is securely used at the second online streamer end, effectively reduces a risk of leaking the online streamer image picture, and improves security of transmitting the online streamer image picture. Before receiving the live interaction request, the server completes encryption of the online streamer image picture. In this way, instead of performing encryption after receiving the live interaction request, the server may send the encrypted online streamer image picture to the second online streamer end in a timely manner after receiving the live interaction request. Therefore, response efficiency of the second online streamer end can be improved, and an effect of responding in a timely manner can be achieved for livestreaming. In addition, instead of performing encryption after receiving the live interaction request, the server performs encryption after receiving the online streamer image picture of the first online streamer. This may provide sufficient time for an encryption process, to perform encryption by selecting a target obfuscation key with a high encryption degree, so as to improve a difficulty of decrypting the encrypted online streamer image picture. Therefore, this further reduces a risk of leaking the online streamer image picture, and improves security of transmitting the online streamer image picture. In addition, the method provided in this application is easy to apply, to reduce transformation costs of each client.

Figure 4:
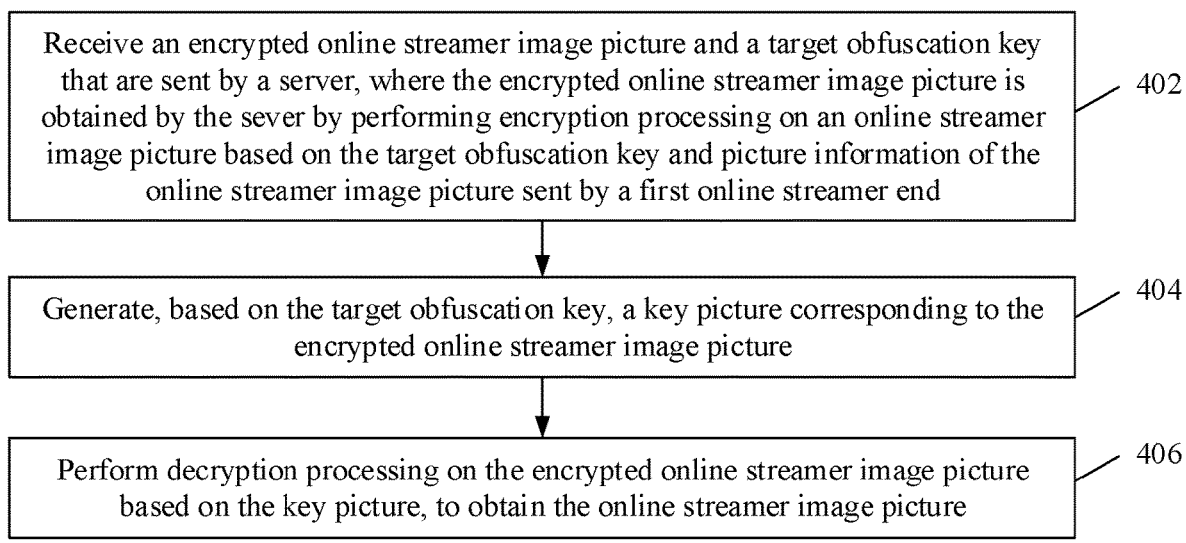
FIG. 4 is a flowchart of another online streamer image picture transmission method in live interaction according to an embodiment of this application.

FIG. 4 is a flowchart of another online streamer image picture transmission method in live interaction according to an embodiment of this application. The method is applied to a second online streamer end, and specifically includes the following steps:

Step 402: Receive an encrypted online streamer image picture and a target obfuscation key that are sent by a server, where the encrypted online streamer image picture is obtained by the sever by performing encryption processing on an online streamer image picture based on the target obfuscation key and picture information of the online streamer image picture sent by a first online streamer end.

Specifically, a first online streamer is any online streamer. In some embodiments, the first online streamer is any online streamer who performs livestreaming by using an avatar or an image of an unreal person. A second online streamer is an online streamer who interacts with the first online streamer. It should be noted that there may be only one online streamer who interacts with the first online streamer, or may be a plurality of online streamers who interact with the first online streamer. When there are a plurality of online streamers who interact with the first online streamer, the second online streamer is any one of the online streamers who interact with the first online streamer. The first online streamer end is a client on which the first online streamer is located. The second online streamer end is a client associated with the second online streamer, namely, an online streamer end corresponding to the second online streamer. The online streamer image picture is a picture resource used when an avatar of the first online streamer is constructed, namely, a model texture mapping resource of the avatar. The target obfuscation key is a key corresponding to obfuscation, and may be a string such as a combination of at least one of a number, a letter, and a symbol, or may be in a form of a matrix or an array.

In actual application, after receiving the online streamer image picture sent by the first online streamer end, the server obtains the target obfuscation key, and then performs encryption processing on the online streamer image picture based on the target obfuscation key and the picture information of the online streamer image picture, to obtain the encrypted online streamer image picture. Then, after receiving a live interaction request for the first online streamer end and the second online streamer end, the server determines, based on an online streamer identifier of the second online streamer in the live interaction request, the second online streamer end corresponding to the second online streamer, and sends the encrypted online streamer image picture and the target obfuscation key to the second online streamer end. In other words, the second online streamer end receives the encrypted online streamer image picture and the target obfuscation key that are sent by the server.

Step 404: Generate, based on the target obfuscation key, a key picture corresponding to the encrypted online streamer image picture.

On the basis of receiving the encrypted online streamer image picture and the target obfuscation key, further, the key picture is generated based on the target obfuscation key.

Specifically, the key picture is a key picture obtained by using a value of each bit in the target obfuscation key as a color value of a pixel.

In some embodiments, the value of each bit in the target obfuscation key may be used as the color value of the pixel, and the key picture is generated based on the pixel corresponding to the obtained color value.

For example, if the target key is "1, 2, 3, 4", 1 is used as a color value of the first pixel, 2 is used as a color value of the second pixel, 3 is used as a color value of the third pixel, and 4 is used as a color value of the fourth pixel. Then, the key picture corresponding to the encrypted online streamer image picture is generated based on the four pixels.

In some embodiments, the color value includes transparency and a chrominance value. In this case, values of every two adjacent bits in the target obfuscation key may be respectively used as transparency and a chrominance value of a pixel, and the key image is generated based on the pixel corresponding to the obtained transparency and chrominance value.

For example, if the target key is "1, 2, 3, 4", 1 is used as transparency of the first pixel, 2 is used as a chrominance value of the first pixel, 3 is used as transparency of the second pixel, and 4 is used as a chrominance value of the second pixel. Then, the key picture corresponding to the encrypted online streamer image picture is generated based on the two pixels.

In some embodiments, the color value includes transparency, a first chrominance value, a second chrominance value, and a third chrominance value. In this case, values of every four adjacent bits in the target obfuscation key may be respectively used as transparency, a first chrominance value, a second chrominance value, and a third chrominance value of a pixel, and the key picture is generated based on the pixel corresponding to the obtained transparency, first chrominance value, second chrominance value, and third chrominance value.

For example, if the target key is "1, 2, 3, 4, 5, 6, 7, 8", 1 is used as transparency of the first pixel, 2 is used as a first chrominance value of the first pixel, 3 is used as a second chrominance value of the first pixel, 4 is used as a third chrominance value of the first pixel, 5 is used as transparency of the second pixel, 6 is used as a first chrominance value of the second pixel, 7 is used as a second chrominance value of the second pixel, and 8 is used as a third chrominance value of the second pixel. Then, the key picture corresponding to the encrypted online streamer image picture is generated based on the two pixels.

Step 406: Perform decryption processing on the encrypted online streamer image picture based on the key picture, to obtain the online streamer image picture.

On the basis of generating the key picture based on the target obfuscation key, further, the online streamer image picture is obtained based on the key picture and the encrypted online streamer image picture.

In actual application, after generating the key picture, the second online streamer end may reproduce the encrypted online streamer image picture based on the key picture, namely, perform decryption processing, to obtain the online streamer image picture of the first online streamer.

For example, the second online streamer end performs a per-frame operation (decryption processing) in a graphics processing unit (GPU) of the second online streamer end by using the key picture and the encrypted online streamer image picture, to render a decrypted online streamer image picture, namely, the online streamer image picture of the first online streamer.

It should be noted that, after obtaining the online streamer image picture of the first online streamer, the second online streamer end needs to render an image of the first online streamer at the second online streamer end based on the online streamer image picture, generates, based on an image of the second online streamer, an interaction video stream in which the first online streamer interacts with the second online streamer, and then pushes the interaction video stream to the server. After receiving the interaction video stream, the server determines an audience identifier corresponding to the second online streamer, that is, determines an audience watching the second online streamer, and then sends the interaction video stream to an audience client on which the audience of the second online streamer is located, so that the audience client displays, based on the interaction video stream, a picture in which the first online streamer interacts with the second online streamer.

In the online streamer image picture transmission method in live interaction provided in this application, the online streamer image picture sent by the first online streamer end is received, and the target obfuscation key is obtained; encryption processing is performed on the online streamer image picture based on the target obfuscation key and the picture information of the online streamer image picture, to obtain the encrypted online streamer image picture; and if the live interaction request for the first online streamer end and the second online streamer end is received, the encrypted online streamer image picture and the target obfuscation key are sent to the second online streamer end. Encryption processing is performed on the online streamer image picture by using the target obfuscation key and the picture information of the online streamer image picture, so that all online streamer image pictures stored in a memory are encrypted. This ensures that the online streamer image picture in the memory is not obtained and is securely used at the second online streamer end, effectively reduces a risk of leaking the online streamer image picture, and improves security of transmitting the online streamer image picture. Before receiving the live interaction request, the server completes encryption of the online streamer image picture. In this way, instead of performing encryption after receiving the live interaction request, the server may send the encrypted online streamer image picture to the second online streamer end in a timely manner after receiving the live interaction request. Therefore, response efficiency of the second online streamer end can be improved, and an effect of responding in a timely manner can be achieved for livestreaming. In addition, instead of performing encryption after receiving the live interaction request, the server performs encryption after receiving the online streamer image picture of the first online streamer. This may provide sufficient time for an encryption process, to perform encryption by selecting a target obfuscation key with a high encryption degree, so as to improve a difficulty of decrypting the encrypted online streamer image picture. Therefore, this further reduces a risk of leaking the online streamer image picture, and improves security of transmitting the online streamer image picture. In addition, the method provided in this application is easy to apply, to reduce transformation costs of each client.

The foregoing describes the schematic solution of the online streamer image picture transmission method in live interaction applied to the second online streamer end in this embodiment. It should be noted that the technical solution of the online streamer image picture transmission method in live interaction applied to the second online streamer end belongs to a same concept as the foregoing technical solution of the online streamer image picture transmission method in live interaction applied to the server. For detailed content not described in detail in the technical solution of the online streamer image picture transmission method in live interaction applied to the second online streamer end, refer to the descriptions in the technical solution of the online streamer image picture transmission method in live interaction applied to the server.

Figure 5:
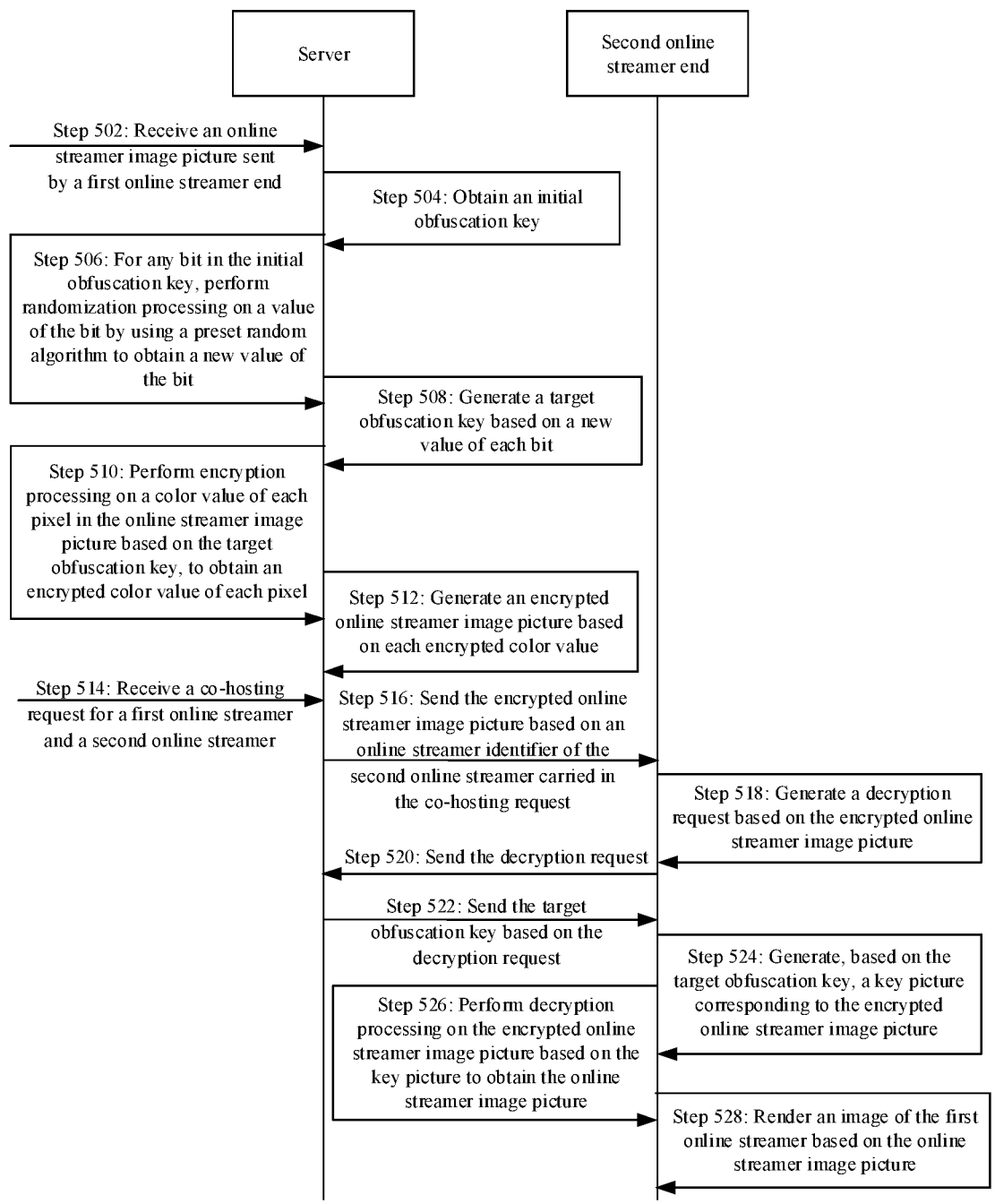
FIG. 5 is a processing flowchart of an online streamer image picture transmission method in live interaction applied to co-hosting between online streamers according to an embodiment of this application.

With reference to FIG. 5, the following further describes the online streamer image picture transmission method in live interaction by using an example in which the online streamer image picture transmission method in live interaction provided in this application is applied to co-hosting between online streamers. FIG. 5 is a processing flowchart of an online streamer image picture transmission method in live interaction applied to co-hosting between online streamers according to an embodiment of this application. The method specifically includes the following steps:

Step 502: A server receives an online streamer image picture sent by a first online streamer end.

Step 504: The server obtains an initial obfuscation key.

Step 506: For any bit in the initial obfuscation key, the server performs randomization processing on a value of the bit by using a preset random algorithm to obtain a new value of the bit.

Step 508: The server generates a target obfuscation key based on a new value of each bit.

Step 510: The server performs encryption processing on a color value of each pixel in the online streamer image picture based on the target obfuscation key, to obtain an encrypted color value of each pixel.

In some embodiments, the color value includes transparency and a chrominance value.

The performing encryption processing on a color value of each pixel in the online streamer image picture based on the target obfuscation key, to obtain an encrypted color value of each pixel includes:

starting from an $i^{th}$ pixel in the online streamer image picture, performing an exclusive OR operation on transparency of the $i^{th}$ pixel in the online streamer image picture and a value of a $(2i-1)^{th}$ bit in the target obfuscation key to obtain encrypted transparency of the $i^{th}$ pixel, where i=1;

performing an exclusive OR operation on a chrominance value of the $i^{th}$ pixel in the online streamer image picture and a value of a $(2i)^{th}$ bit in the target obfuscation key to obtain an encrypted chrominance value of the $i^{th}$ pixel;

obtaining an encrypted color value of the $i^{th}$ pixel based on the encrypted transparency and the encrypted chrominance value of the $i^{th}$ pixel;

determining whether the $i^{th}$ pixel in the online streamer image picture is the last pixel; and if the $i^{th}$ pixel in the online streamer image picture is not the last pixel, increasing i by 1, and returning to the step of performing an exclusive OR operation on transparency of the $i^{th}$ pixel in the online streamer image picture and a value of a $(2i-1)^{th}$ bit in the target obfuscation key.

In some embodiments, the color value includes transparency, a first chrominance value, a second chrominance value, and a third chrominance value.

The performing encryption processing on a color value of each pixel in the online streamer image picture based on the target obfuscation key, to obtain an encrypted color value of each pixel includes:

starting from a $j^{th}$ pixel in the online streamer image picture, performing an exclusive OR operation on transparency of the $j^{th}$ pixel in the online streamer image picture and a value of a $(4j-3)^{th}$ bit in the target obfuscation key to obtain encrypted transparency of the $j^{th}$ pixel, where j=1;

performing an exclusive OR operation on a first chrominance value of the $i^{th}$ pixel in the online streamer image picture and a value of a $(4j-2)^{th}$ bit in the target obfuscation key to obtain an encrypted first chrominance value of the $i^{th}$ pixel;

performing an exclusive OR operation on a second chrominance value of the $j^{th}$ pixel in the online streamer image picture and a value of a $(4j-1)^{th}$ bit in the target obfuscation key to obtain an encrypted second chrominance value of the $i^{th}$ pixel;

performing an exclusive OR operation on a third chrominance value of the $j^{th}$ pixel in the online streamer image picture and a value of a $(4j)^{th}$ bit in the target obfuscation key to obtain an encrypted third chrominance value of the $i^{th}$ pixel;

obtaining an encrypted color value of the $j^{th}$ pixel based on the encrypted transparency, the encrypted first chrominance value, the encrypted second chrominance value, and the encrypted third chrominance value of the $j^{th}$ pixel;

determining whether the $j^{th}$ pixel in the online streamer image picture is the last pixel; and if the $j^{th}$ pixel in the online streamer image picture is not the last pixel, increasing j by 1, and returning to the step of performing an exclusive OR operation on transparency of the $j^{th}$ pixel in the online streamer image picture and a value of a $(4j-1)^{th}$ bit in the target obfuscation key.

Step 512: The server generates an encrypted online streamer image picture based on each encrypted color value.

Step 514: The server receives a co-hosting request for a first online streamer and a second online streamer.

Step 516: The server sends the encrypted online streamer image picture to a second online streamer end based on an online streamer identifier of the second online streamer carried in the co-hosting request.

Step 518: The second online streamer end generates a decryption request based on the encrypted online streamer image picture.

Step 520: The second online streamer end sends the decryption request to the server.

Step 522: The server sends the target obfuscation key to the second online streamer end based on the decryption request.

Step 524: The second online streamer end generates, based on the target obfuscation key, a key picture corresponding to the encrypted online streamer image picture.

Step 526: The second online streamer end performs decryption processing on the encrypted online streamer image picture based on the key picture to obtain the online streamer image picture.

Step 528: The second online streamer end renders an image of the first online streamer based on the online streamer image picture.

In the online streamer image picture transmission method in live interaction provided in this application, encryption processing is performed on the online streamer image picture by using the target obfuscation key and picture information of the online streamer image picture, so that all online streamer image pictures stored in a memory are encrypted. This ensures that the online streamer image picture in the memory is not obtained and is securely used at the second online streamer end, effectively reduces a risk of leaking the online streamer image picture, and improves security of transmitting the online streamer image picture. Before receiving a live interaction request, the server completes encryption of the online streamer image picture. In this way, instead of performing encryption after receiving the live interaction request, the server may send the encrypted online streamer image picture to the second online streamer end in a timely manner after receiving the live interaction request. Therefore, response efficiency of the second online streamer end can be improved, and an effect of responding in a timely manner can be achieved for livestreaming. In addition, instead of performing encryption after receiving the live interaction request, the server performs encryption after receiving the online streamer image picture of the first online streamer. This may provide sufficient time for an encryption process, to perform encryption by selecting a target obfuscation key with a high encryption degree, so as to improve a difficulty of decrypting the encrypted online streamer image picture. Therefore, this further reduces a risk of leaking the online streamer image picture, and improves security of transmitting the online streamer image picture. In addition, the method provided in this application is easy to apply, to reduce transformation costs of each client.

On the basis of the online streamer image picture transmission method in live interaction provided in this application, an image model file may be further transmitted, that is, an image model file transmission method provided in another embodiment of this application is applied to a server, and specifically includes the following steps:

Step A2: Receive an image model file of a first online streamer that is sent by a first client.

Specifically, an online streamer, namely, an online live streamer, is a person who is responsible for a series of tasks such as planning, editing, recording, production, and audience interaction in an Internet program or activity, and serves as a host. The first online streamer is any online streamer. In some embodiments, the first online streamer is any online streamer who performs livestreaming by using an avatar or an image of an unreal person. The first client is a client on which the first online streamer is located, and may be any intelligent device such as a mobile phone, a tablet computer, and an intelligent computer, namely, a first online streamer end. The image model file is a resource such as a picture and a model used when an avatar of the first online streamer is constructed, namely, an online streamer model file or an online streamer image model file.

In actual application, when an online streamer selects, in an upload interface by using a client on which the online streamer is located, an image model file of the online streamer that needs to be uploaded by the online streamer and that is used to construct an image of the online streamer, after the online streamer clicks a key "OK" or any key that indicates upload confirmation, the client sends the image model file of the online streamer to the server, that is, the first client sends the image model file of the first online streamer to the server, in other words, the server receives the image model file of the first online streamer that is sent by the first client.

For example, a game online streamer selects, from a local database by using an upload interface of a live platform, an image model file MX corresponding to an avatar that the game online streamer expects to display, uploads the image model file MX to the upload interface, and clicks a key "OK" for confirming uploading. The live platform uploads the image model file XX to the server.

It should be noted that the image model file may include an image picture and an image model, and the image model may be two-dimensional or three-dimensional. This is not limited in this application.

Step A4: Obtain a target key, and perform encryption processing on the image model file based on the target key to obtain an encrypted image model file.

On the basis of receiving the image model file of the first online streamer that is sent by the first client, further, the target key is obtained, and encryption processing is performed on the image model file based on the target key to obtain the encrypted image model file.

Specifically, a key is a parameter, and is a parameter that is input in an algorithm of converting a plaintext into a ciphertext or converting a ciphertext into a plaintext. The target key is a key for an image model file. The encrypted image model file is an image model file obtained after encryption. Encryption processing is a process of changing original information data by using a special algorithm.

In actual application, the server may obtain the target key, and then process the image model file based on the target key, that is, perform encryption processing on the image model file based on the target key, to obtain an encrypted image picture corresponding to an image picture.

In addition, to improve a transmission speed of the image model file in a transmission process and reduce transmission duration, compression processing may be performed on a size of the image model file. In other words, before the performing encryption processing on the image model file based on the target key to obtain an encrypted image model file, the method further includes:

performing scaling processing on picture data in the image model file to obtain an updated image model file.

Correspondingly, the performing encryption processing on the image model file based on the target key to obtain an encrypted image model file includes:

performing encryption processing on the updated image model file based on the target key to obtain the encrypted image model file.

Specifically, scaling processing is a process of reducing a data amount of picture data by changing some formats of the picture data.

In actual application, scaling processing may be processed on the picture data in the image model file based on a preset scaling rule, to reduce a package size of the image model file to obtain the updated image model file. Then, encryption processing is performed on the updated image model file based on the target key, to obtain the encrypted image model file.

For example, if a size of the picture data in the image model file is 3 M, compression processing is performed on the picture data to obtain 100 K picture data. In this case, the 100 K picture data and non-picture data in the image model file constitute the updated image model file. Then, encryption processing is performed, based on the target key, on the image model file corresponding to the 100 K picture data, that is, encryption processing is performed on the updated image model file to obtain the encrypted image model file.

In one or more embodiments of this application, to improve a speed of loading the image model file by a second client, scaling processing may be performed on the picture data based on one or more commonly used application scenarios, to send, based on different application scenarios of the second client, image model files obtained after different scaling processing is performed. In other words, a specific implementation process of performing scaling processing on the picture data in the image model file to obtain the updated image model file may be as follows:

obtaining a preset scaling specification table, where the preset scaling specification table includes at least one scaling specification; and performing scaling processing on the picture data in the image model file by using the scaling specification, to obtain the updated image model file in which the picture data is scaled.

Specifically, the scaling specification is a standard for scaling picture data, so that picture data obtained after scaling processing meets the scaling specification. The preset scaling specification table is a set of scaling specifications.

In actual application, for different application scenarios of the second client, for example, different display resolution and different screen sizes of the second client, at least one commonly used scaling specification is preset. Then, scaling processing is performed on the picture data based on each scaling specification, to obtain scaled picture data corresponding to each scaling specification, that is, scaling specifications are in a one-to-one correspondence with a quantity of times of scaling the picture data, that is, a quantity of scaling specifications is the same as a quantity of times of performing scaling processing on the picture data. On the basis of obtaining the scaled picture data, the updated image model file in which the picture data is scaled is further obtained.

For example, the preset scaling specification table is a resolution specification table, and includes four scaling specifications, namely, four resolution specifications: 512*512, 1024*1024, 2048*2048, and 4096*4096. In this case, scaling processing is separately performed on the picture data in the image model file based on 512*512, 1024*1024, 2048*2048, and 4096*4096, to obtain picture data with resolution of 512*512, picture data with resolution of 1024*1024, picture data with resolution of 2048*2048, and picture data with resolution of 4096*4096. Then, the picture data with the resolution of 512*512 corresponds to an updated image model file, the picture data with the resolution of 1024*1024 corresponds to an updated image model file, the picture data with the resolution of 2048*2048 corresponds to an updated image model file, and the picture data with the resolution of 4096*4096 corresponds to an updated image model file.

To further improve security of transmitting the image model file and increase a difficulty of decrypting the encrypted image model file, encryption processing may be performed on the image model file two times. First encryption processing is performed on the image model file based on a preset obfuscation encryption algorithm, and second encryption processing is performed on the image model file based on a preset symmetric encryption algorithm. In other words, when the target key includes an obfuscation key and a symmetric key, a specific implementation process of performing encryption processing on the image model file based on the target key to obtain the encrypted image model file may be as follows:

obtaining a preset obfuscation encryption algorithm and an obfuscation key, and performing first encryption processing on the image model file based on the preset obfuscation encryption algorithm and the obfuscation key to obtain an intermediate image model file; and obtaining a preset symmetric encryption algorithm and a symmetric key, and performing second encryption processing on the intermediate image model file based on the preset symmetric encryption algorithm and the symmetric key to obtain the encrypted image model file.

Specifically, obfuscation is an encryption operation that enables a relationship between a key and a ciphertext (image model file) to be as obfuscated as possible. The obfuscation key is a key corresponding to obfuscation, and may be a string such as a combination of at least one of a number, a letter, and a symbol, or may be in a form of a matrix or an array. The preset obfuscation encryption algorithm is an obfuscation encryption algorithm that is preset, and may be an exclusive OR obfuscation encryption algorithm, or may be an AND obfuscation encryption algorithm. This is not limited in this application. A symmetric encryption algorithm is an encryption method in which a single-key cryptosystem is used. A same key may be used to encrypt and decrypt information. This is also referred to as single-key encryption. The preset symmetric encryption algorithm is a symmetric encryption algorithm that is preset, and may be a data encryption standard (DES) algorithm or an advanced encryption standard (AES) algorithm. This is not limited in this application. The symmetric key is a key corresponding to the preset symmetric encryption algorithm.

In actual application, the target key may include the obfuscation key and the symmetric key. First, the preset obfuscation encryption algorithm and the obfuscation key corresponding to the image model file may be obtained. Then, an image picture in the image model file, namely, an online streamer image picture, may be read. Next, encryption processing is performed on a color value of each pixel in the image picture by using the preset obfuscation encryption algorithm and based on the obfuscation key, to generate the intermediate image model file in which the image picture is encrypted. Then, the preset symmetric encryption algorithm and the symmetric key corresponding to the image model file are obtained, and the intermediate image model file is encrypted by using the preset symmetric encryption algorithm and based on the symmetric key, to obtain the encrypted image model file.

In some embodiments, when the color value includes transparency and a chrominance value, that encryption processing is performed on the color value of each pixel in the image picture by using the preset obfuscation encryption algorithm and based on the obfuscation key may be: starting from an $i^{th}$ pixel in the image picture, performing an exclusive OR operation on transparency of the $i^{th}$ pixel in the image picture and a value of a $(2i-1)^{th}$ bit in the target obfuscation key to obtain encrypted transparency of the $i^{th}$ pixel, where i=1; performing an exclusive OR operation on a chrominance value of the $i^{th}$ pixel in the image picture and a value of a $(2i)^{th}$ bit in the target obfuscation key to obtain an encrypted chrominance value of the $i^{th}$ pixel; obtaining an encrypted color value of the $i^{th}$ pixel based on the encrypted transparency and the encrypted chrominance value of the $i^{th}$ pixel; determining whether the $i^{th}$ pixel in the image picture is the last pixel; and if the $i^{th}$ pixel in the image picture is not the last pixel, increasing i by 1, and returning to the step of performing an exclusive OR operation on transparency of the $i^{th}$ pixel in the image picture and a value of a $(2i-1)^{th}$ bit in the target obfuscation key.

Specifically, the transparency is used to indicate a transparency degree of a pixel, and higher transparency indicates a more transparent pixel. The chrominance value is a value corresponding to color when a pixel is displayed, for example, an RGB value.

In actual application, first, the first pixel in the image picture is selected. Next, transparency and a chrominance value of the first pixel are determined. Then, the exclusive OR operation is performed on a value of the first bit in the target obfuscation key and the transparency of the first pixel to obtain encrypted transparency of the first pixel. The exclusive OR operation is performed on a value of the second bit in the target obfuscation key and the chrominance value of the first pixel to obtain an encrypted chrominance value of the first pixel. An encrypted color value of the first pixel is obtained based on the encrypted transparency and the encrypted chrominance value of the first pixel. Then, the second pixel in the image picture is selected. Next, transparency and a chrominance value of the second pixel are determined. Then, the exclusive OR operation is performed on a value of the third bit in the target obfuscation key and the transparency of the second pixel to obtain encrypted transparency of the second pixel. The exclusive OR operation is performed on a value of the fourth bit in the target obfuscation key and the chrominance value of the second pixel to obtain an encrypted chrominance value of the second pixel. An encrypted color value of the second pixel is obtained based on the encrypted transparency and the encrypted chrominance value of the second pixel. A similar process is executed, until an encrypted color value of the last pixel in the image picture is determined. In this way, in a manner of encrypting the transparency and the chrominance value, the image picture can be encrypted at a finer granularity. This further improves a difference between the encrypted image picture and the image picture, and improves security of the image picture in a transmission process.

In some embodiments, when the color value includes transparency, a first chrominance value, a second chrominance value, and a third color, that encryption processing is performed on the color value of each pixel in the image picture by using the preset obfuscation encryption algorithm and based on the obfuscation key may be: starting from a $j^{th}$ pixel in the image picture, performing an exclusive OR operation on transparency of the $j^{th}$ pixel in the image picture and a value of a $(4j-3)^{th}$ bit in the target obfuscation key to obtain encrypted transparency of the $j^{th}$ pixel, where j=1; performing an exclusive OR operation on a first chrominance value of the $j^{th}$ pixel in the image picture and a value of a $(4j-2)^{th}$ bit in the target obfuscation key to obtain an encrypted first chrominance value of the $j^{th}$ pixel; performing an exclusive OR operation on a second chrominance value of the $j^{th}$ pixel in the image picture and a value of a $(4j-1)^{th}$ bit in the target obfuscation key to obtain an encrypted second chrominance value of the $j^{th}$ pixel; performing an exclusive OR operation on a third chrominance value of the $j^{th}$ pixel in the image picture and a value of a $(4j)^{th}$ bit in the target obfuscation key to obtain an encrypted third chrominance value of the $j^{th}$ pixel; obtaining an encrypted color value of the $j^{th}$ pixel based on the encrypted transparency, the encrypted first chrominance value, the encrypted second chrominance value, and the encrypted third chrominance value of the $j^{th}$ pixel; determining whether the $j^{th}$ pixel in the image picture is the last pixel; and if the $j^{th}$ pixel in the image picture is not the last pixel, increasing j by 1, and returning to the step of performing an exclusive OR operation on transparency of the $j^{th}$ pixel in the image picture and a value of a $(4j-1)^{th}$ bit in the target obfuscation key.

Specifically, the transparency is used to indicate a transparency degree of a pixel, and higher transparency indicates a more transparent pixel. The first chrominance value, the second chrominance value, and the third chrominance value are values respectively corresponding to red, green, and blue when a pixel is displayed, that is, the first chrominance value, the second chrominance value, and the third chrominance value are respectively an R value, a G value, and a B value.

In actual application, first, the first pixel in the image picture may be selected. Next, transparency, a first chrominance value, a second chrominance value, and a third chrominance value of the first pixel are determined. Then, the exclusive OR operation is performed on a value of the first bit in the target obfuscation key and the transparency of the first pixel to obtain encrypted transparency of the first pixel. The exclusive OR operation is performed on a value of the second bit in the target obfuscation key and the first chrominance value of the first pixel to obtain an encrypted first chrominance value of the first pixel. The exclusive OR operation is performed on a value of the third bit in the target obfuscation key and the second chrominance value of the first pixel to obtain an encrypted second chrominance value of the first pixel. The exclusive OR operation is performed on a value of the fourth bit in the target obfuscation key and the third chrominance value of the first pixel to obtain an encrypted third chrominance value of the first pixel. Then, an encrypted color value of the first pixel is obtained based on the encrypted transparency, the encrypted first chrominance value, the encrypted second chrominance value, and the encrypted third chrominance value of the first pixel. Then, the second pixel in the image picture is selected. Next, transparency, a first chrominance value, a second chrominance value, and a third chrominance value of the second pixel are determined. Then, the exclusive OR operation is performed on a value of the fifth bit in the target obfuscation key and the transparency of the second pixel to obtain encrypted transparency of the second pixel. The exclusive OR operation is performed on a value of the sixth bit in the target obfuscation key and the first chrominance value of the second pixel to obtain an encrypted first chrominance value of the second pixel. The exclusive OR operation is performed on a value of the seventh bit in the target obfuscation key and the second chrominance value of the second pixel to obtain an encrypted second chrominance value of the second pixel. The exclusive OR operation is performed on a value of the eighth bit in the target obfuscation key and the third chrominance value of the second pixel to obtain an encrypted third chrominance value of the second pixel. Then, an encrypted color value of the second pixel is obtained based on the encrypted transparency, the encrypted first chrominance value, the encrypted second chrominance value, and the encrypted third chrominance value of the second pixel. A similar process is executed, until an encrypted color value of the last pixel in the image picture is determined. In this way, in a manner of encrypting the transparency, the first chrominance value, the second chrominance value, and the third chrominance value, the image picture can be encrypted at a finer granularity. This further improves a difference between the encrypted image picture and the image picture, and improves security of the image picture in a transmission process.

In an image model file upload method provided in an embodiment of this application, the server includes a management area, a database, and a processing area. After receiving an image model file of a first online streamer, a first client uploads the image model file to the server. The server stores the image model file by using the database, and determines image information. The image information is information determined by the database based on the image model file, and includes a unique identifier of the image model file, namely, an image unique identifier. The database transmits the image information to the management area of the server, the management area returns the image information to the first client, and the management area pushes the image information to a task processing queue for processing by the processing area. The processing area requests the image model file from the database based on the image information, and then the database returns the image information to the processing area. The processing area performs processing such as scaling and encryption on the image model file to obtain an encrypted image model file.

In another image model file upload method provided in an embodiment of this application, the server includes an execution area (a general name of a management area and a processing area) and a database. After receiving an image model file of a first online streamer, a first client packages the image model file, and uploads the image model file to the server. The server stores the image model file by using the database, and determines a storage link. The storage link is a storage address of the image model file in the database. The database sends the storage link to the first client, and then the first client stores the storage link, and sends the storage link to the execution area. The execution area stores the storage link, and determines an image unique identifier, that is, determines the image unique identifier based on the storage link. Further, the execution area obtains a processing configuration, and then pushes the image unique identifier to an asynchronous processing queue. The asynchronous processing queue performs compression processing on the image unique identifier based on the processing configuration. After processing is completed, image information is obtained. The image information includes the image unique identifier. Then, the execution area returns the image information to the first client. Subsequently, an image model file encryption method may be performed.

In an image model file encryption method provided in an embodiment of this application: An execution area receives a push task, and then obtains image information, to determine whether an image model file corresponding to the image information is encrypted. If the image model file is encrypted, the execution area exits the process. If the image model file is not encrypted, the execution area requests the image model file from a database based on the image information. If the request fails, the execution area requests the image model file again. If the request succeeds, the database returns the image model file. Then, the execution area decompresses the image model file by using a decompression algorithm, and invokes an FFmpeg command to perform scaling processing on image data in the image model file based on a preset scaling specification table. Then, an obfuscation key is generated, and first encryption processing is performed on the image data in the image model file by using a preset obfuscation encryption algorithm, to obtain an intermediate image model file and record the obfuscation key. A symmetric key is obtained, and second encryption processing is performed on the intermediate image model file, namely, symmetric encryption. The symmetric key may be a 256-bit key, and each encrypted image model file corresponds to an independent symmetric key. Then, compression processing is performed on the intermediate image model file on which the second encryption processing is performed, to obtain an encrypted image model file. Then, the encrypted image model file is sent to the database, and the database stores the encrypted image model file. After storage success is returned, the execution area determines that a single task is processed. After all tasks are processed, a task processing status is updated to complete the push task.

Step A6: If an interaction request for the first online streamer and a second online streamer is received, send the encrypted image model file to the second client based on an online streamer identifier of the second online streamer carried in the interaction request.

On the basis of performing encryption processing on the image picture based on the target obfuscation key and picture information of the image picture to obtain the encrypted image picture, further, when the interaction request for the first online streamer and the second online streamer is received, the encrypted image model file is sent to the second client based on the online streamer identifier of the second online streamer in the interaction request.

Specifically, the interaction request is a request generated based on a requirement of interaction between two online streamers. The interaction request may be a co-hosting request, or may be a player killing (PK) request, for example, a co-hosting request initiated by the first online streamer to the second online streamer, or a player killing request initiated by the second online streamer to the first online streamer. The second online streamer is a liver streamer who interacts with the first online streamer. It should be noted that there may be only one online streamer who interacts with the first online streamer, or may be a plurality of online streamers who interact with the first online streamer. When there are a plurality of online streamers who interact with the first online streamer, the second online streamer is any one of the online streamers who interact with the first online streamer. For example, the first online streamer is an online streamer A1, four online streamers such as the online streamer A1, an online streamer A2, an online streamer A3, and an online streamer A4 interact with each other, and the second online streamer may be any one of the online streamer A2, the online streamer A3, and the online streamer A4. The online streamer identifier may be an online streamer name, or may be an online streamer identity document (ID), namely, a sequence number or an account number. This is not limited in this application. The second client is a client associated with the second online streamer, namely, a client corresponding to the second online streamer. The interaction request for the first online streamer and the second online streamer is a live interaction request for the first online streamer end and a second online streamer end.

In actual application, after the server receives a request that is sent by the first online streamer and that is used to interact with the second online streamer, or receives a request that is sent by the second online streamer and that is used to interact with the first online streamer, that is, after the server receives the interaction request for the first online streamer and the second online streamer, the server determines, based on the online streamer identifier of the second online streamer in the interaction request, the second client corresponding to the second online streamer, and sends the encrypted image model file to the second client.

For example, if an online streamer A needs to interact with an online streamer B, the online streamer A or the online streamer B sends an interaction request for the online streamer A and the online streamer B to the server. When the online streamer A is used as the first online streamer A, the server sends, based on an online streamer identifier of the online streamer B in the interaction request, an encrypted image model file a corresponding to the online streamer A to the second client corresponding to the online streamer B, namely, to a client on which the online streamer B is located. When the online streamer B is used as the first online streamer B, the server sends, based on an online streamer identifier of the online streamer A in the interaction request, an encrypted image model file b corresponding to the online streamer B to the second client corresponding to the online streamer A, namely, to a client on which the online streamer A is located.

In one or more embodiments of this specification, after receiving the interaction request for the first online streamer and the second online streamer, the server may send a download link of the encrypted image model file to the second client based on the online streamer identifier of the second online streamer carried in the interaction request, and then the second client downloads the corresponding encrypted image model file from the database of the server based on the download link.

Step A8: When a decryption request sent by the second client is received, send the target key to the second client, where the target key is used by the second client to decrypt the encrypted image model file to obtain the image model file.

On the basis of sending the encrypted image model file to the second client based on the online streamer identifier of the second online streamer in the interaction request, further, when receiving the decryption request, the server sends the target key to the second client.

In actual application, after receiving the encrypted image picture, the second client needs to request the target obfuscation key from the server. In this case, the second client generates the decryption request based on the encrypted image model file, and then sends the decryption request to the server. In other words, the server receives the decryption request sent by the second client. Further, the server sends, based on an identifier that is of the encrypted image model file and that is carried in the decryption request, the target key corresponding to the encrypted image model file to the second client. Then, the second client decrypts the encrypted image model file based on the target key to obtain the image model file of the first online streamer, and then renders an image of the first online streamer at the second client based on the image model file of the first online streamer.

The foregoing example is still used. When the online streamer A is used as the first online streamer, after receiving the encrypted image model file a, the second client corresponding to the online streamer B generates a decryption request a1 based on the encrypted image model file a, and then sends the decryption request a1 to the server. The server sends, based on the decryption request a1, a target key a2 corresponding to the encrypted image model file a to the second client. Then, the second client decrypts the encrypted image model file a based on the target key a2 to obtain an image model file a3 of the online streamer A. When the online streamer B is used as the first online streamer, after receiving the encrypted image model file b, the second client corresponding to the online streamer A generates a decryption request b1 based on the encrypted image model file b, and then sends the decryption request b1 to the server. The server sends, based on the decryption request b1, a target key b2 corresponding to the encrypted image model file b to the second client. Then, the second client decrypts the encrypted image model file b based on the target key b2 to obtain an image model file b3 of the online streamer B.

To improve security of the image model file, when receiving the decryption request, the server needs to verify the decryption request, to determine appropriateness of using the target key by the client that sends the decryption request. If the verification succeeds, the server returns the target key. In other words, a specific implementation process of sending the target key to the second client may be as follows:

verifying the decryption request sent by the second client, to determine whether the decryption request meets a preset decryption rule; and
   if the decryption request meets the preset decryption rule, sending the target key to the second client; or
   if the decryption request does not meet the preset decryption rule, skipping responding to the decryption request.

Specifically, the preset decryption rule is a rule for determining appropriateness of requesting a target key by a client, that is, a rule for determining whether a decryption request is appropriate, for example, determining whether a client that sends the decryption request is the second client on which the second online streamer is located.

In actual application, after receiving the decryption request, the server needs to perform appropriateness verification on the decryption request, that is, determine whether the decryption request meets the preset decryption rule, that is, determine, based on an interaction relationship between online streamers, whether the target key can be returned. If the decryption request meets the preset decryption rule, the server sends the target key to the client. If the decryption request does not meet the preset decryption rule, the server does not respond to the decryption request, or returns request failure information to the second client. In this way, the server determines, based on the verification on the decryption request, whether the target key can be fed back, instead of directly sending the target key when receiving the decryption request, to prevent a non-second client from obtaining the target key and stealing the image model file of the first online streamer. Therefore, security of transmitting the image model file is improved.

For example, a client R1 sends a decryption request r1 to the server, and the server verifies the decryption request r1 based on the preset decryption rule. If a verification result is that the client R1 is not the second client corresponding to the second online streamer, the server does not respond to the decryption request r1. A client R2 sends a decryption request r2 to the server, and the server verifies the decryption request r2 based on the preset decryption rule. If a verification result is that the client R2 sending the decryption request is the second client corresponding to the second online streamer, the server sends the target key to the client R2.

In some embodiments, to prevent the target key and the image model file from being leaked because the target key is intercepted in a process of sending the target key from the server to the second client or the server mistakenly sends the target key to another client, the decryption request sent by the second client carries a second-client public key, so that the server encrypts the target key based on the second-client public key, to prevent the target key from being leaked. In other words, when the decryption request carries the second-client public key, a specific implementation process of sending the target key to the second client may be as follows:

performing third encryption processing on the target key based on the second-client public key to obtain an encrypted target key; and sending the encrypted target key to the second client.

Specifically, the second-client public key is a key that is provided by the second client and that is used to encrypt the target key.

In actual application, when the decryption request meets the preset decryption rule, the server encrypts, based on the second-client public key in the decryption request, the target key requested by the second client, to obtain the encrypted target key, and then sends the encrypted target key to the second client. Then, the second client decrypts the encrypted target key by using the second-client public key, to obtain the target key.

For example, the second-client public key is "123123", the target key is "123456", and the server performs encryption processing on the target key to obtain the encrypted target key "****". Then, the server sends "**" to the second client. The second client decrypts "****" by using the second-client public key "123123" to obtain the target key "123456".

In some embodiments, to prevent the target key and the image model file from being leaked because the target key is intercepted in a process of sending the target key from the server to the second client or the server mistakenly sends the target key to another client, when the decryption request carries a second-client public key, a specific implementation process of sending the target key to the second client may be as follows:

generating a server private key and a server public key, where the server private key and the server public key are a key pair;

generating a first key based on the second-client public key and the server private key, and performing third encryption processing on the target key based on the first key, to obtain an encrypted target key; and sending the encrypted target key and the server public key to the second client, where the server public key is used by the second client to generate a second key based on a second-client private key and decrypt the encrypted target key based on the second key, and the second-client private key and the second-client public key are a key pair.

In actual application, the second client generates a private-public key pair, namely, the second-client private key and the second-client public key. The second client generates a decryption request that carries the second-client public key, and sends the decryption request to the server. After receiving the decryption request, the server also generates a private-public key pair, namely, the server private key and the server public key, then obtains the first key through calculation based on the server private key and the second-client public key, and then encrypts the target key based on the first key to obtain the encrypted target key. The server returns the encrypted target key and the server public key to the second client. The second client performs calculation based on the server public key and the second-client private key to obtain the second key. The second key is the same as the first key. Further, the second client decrypts the encrypted target key based on the second key to obtain the target key.

For example, the second-client private key is "112233", the second-client public key is "123123", the server private key is "223344", the server public key is "234234", and the target key is "123456". The second client sends, to the server, the decryption request that carries "123123". Then, the server generates the first key "346467" based on "123123" and "223344", and performs encryption processing on the target key based on "346467" to obtain the encrypted target key "****". Then, the server sends "**" and "234234" to the second client. Then, the second client generates the second key "346467" based on "234234" and "112233", and the second client decrypts "****" by using "346467" to obtain the target key "123456".

In addition, to ensure security of transmitting the image picture, or to subsequently trace a leakage path, before sending the target key to the second client, the server further needs to record file use information of the second client. In other words, before the target key is sent to the second client, the method further includes:

when the decryption request meets the preset decryption rule, extracting and recording file use information of the second client carried in the decryption request, where the file use information includes at least one of a user identifier, a use scenario, a use range, a used file identifier, and a use time that correspond to the second client.

Specifically, the user identifier is a user corresponding to the second client, namely, a user identifier of the second online streamer. The use scenario is resolution of a display of a computer device corresponding to the second client, for example, resolution of a screen of a mobile phone and resolution of a display of a computer. The use range is a purpose of using the target key and the encrypted image model file by the second client, for example, displaying the image of the first online streamer at the second client. The used file identifier is identifiers corresponding to the target key and the encrypted image model file that are used by the second client. The use time is a time at which the second client uses the target key and the encrypted image model file, and may be represented by using a time at which the second client sends the decryption request.

In actual application, when the decryption request meets the preset decryption rule, the server needs to send the target key to the second client. To ensure that traceability of use of the target obfuscation key can be implemented, and a leakage path can be traced, so as to provide clues and data support for recovery after an unfortunate loss, before sending the target key, the server needs to extract and record the file use information of the second client in the decryption request. The file use information includes at least one of a user identifier, a use scenario, a use range, a used file identifier, and a use time that correspond to the second client.

For example, if a decryption request sent by a client M meets the preset decryption rule, file use information of the client M is extracted from the decryption request, including: a user m1 (user identifier), resolution 512*512 (use scenario), live watching (use scenario), a target key m2 and an encrypted image model file m3 (used file identifier), and Nov. 18, 2021 16:30 (use time), and the file use information of the client M is recorded.

During interaction between the first online streamer and the second online streamer, the second client further needs to render a dynamic image of the first online streamer at the second client based on the image model file, generates an interaction video stream in which the first online streamer interacts with the second online streamer, and send the interaction video stream to the server. Then, the server sends the video stream to a client on which an audience of the second online streamer is located. In other words, after the target key is sent to the second client, the method further includes:

receiving an interaction video stream sent by the second client, where the interactive video stream is generated by the second client based on the image model file;

determining an audience identifier corresponding to the second online streamer; and sending the interaction video stream to an audience client corresponding to the audience identifier, where the interaction video stream is used by the audience client to display a picture in which the first online streamer interacts with the second online streamer.

Specifically, the interaction video stream is a video stream generated through interaction between the first online streamer and the second online streamer, and is used to display content of interaction between the first online streamer and the second online streamer. The audience identifier is an identifier corresponding to an audience watching the second online streamer, and the audience client is a client on which the audience of the second online streamer is located.

In actual application, after the second client decrypts the encrypted image model file to obtain the image model file, the second client renders the dynamic image of the first online streamer at the second client based on the image model file, generates, based on an image of the second online streamer, the interaction video stream in which the first online streamer interacts with the second online streamer, and then pushes the interaction video stream to the server. After receiving the interaction video stream, the server determines the audience identifier corresponding to the second online streamer, that is, determines the audience watching the second online streamer, and then sends the interaction video stream to the audience client on which the audience of the second online streamer is located, so that the audience client displays, based on the interaction video stream, a picture in which the first online streamer interacts with the second online streamer.

Live PK between an online streamer 1 and an online streamer 2 is used as an example to describe an image model file transmission method.

1) The online streamer 1 uploads an image model file P of the online streamer 1 to the server by using a client ①, the online streamer 2 uploads an image model file Q of the online streamer 2 to the server by using a client ②, and the server separately stores and encrypts the image model file P and the image model file Q to obtain an encrypted image model file p and the encrypted image model file q.

2) The online streamer 1 initiates a live PK request to the online streamer 2 by using the server, and the online streamer 2 receives, by using the server, the live PK request initiated by the online streamer 1. The server stores information about the online streamer 1 and the online streamer 2 and a correspondence, for example, an ID of the online streamer 1, an ID of the online streamer 2, and room information.

3) The client ① queries whether the image model file Q of the online streamer 2 exists in a local cache; and if the image model file Q does not exist in the local cache, requests the server to download the image model file Q and a target key corresponding to the image model file Q; or if the image model file Q exists in the local cache, requests a key corresponding to the image model file Q from the server.

In addition, the client ② queries whether the image model file P of the online streamer 2 exists in a local cache; and if the image model file P does not exist in the local cache, requests the server to download the image model file P and a target key corresponding to the image model file P; or if the image model file P exists in the local cache, requests a key corresponding to the image model file P from the server.

4) The server performs, based on identifiers of the online streamer 1 and the online streamer 2 in the live PK request, authentication on a request that the client ① obtains the encrypted image model file q or a target key corresponding to the encrypted image model file q, and a request that the client ② obtains the encrypted image model file p or a target key corresponding to the encrypted image model file p. After the authentication succeeds, the server sends the encrypted image model file q and the target key corresponding to the encrypted image model file q to the client ①, and the server sends the encrypted image model file p and the target key corresponding to the encrypted image model file p to the client ②.

For example, if the live PK request corresponds to the online streamer 1 and the online streamer 2, the server binds a correspondence between the online streamer 1 and the online streamer 2. When receiving a request of the client ① to obtain the image model file P, the server determines whether a correspondence exists between the online streamer 1 and the online streamer 2. If a correspondence exists between the online streamer 1 and the online streamer 2, authentication succeeds.

5) The client ① decrypts the encrypted image model file q based on the target key to obtain the image model file Q, and the client ② decrypts the encrypted image model file p based on the target key to obtain the image model file P.

6) In a PK process between the online streamer 1 and the online streamer 2, the client ① renders, based on the image model file Q and the image model file P, a picture in which the online streamer 1 and the online streamer 2 perform PK by using an avatar, generates a first interaction video stream, and sends the first interaction video stream to the server; and the client ② renders, based on the image model file P and the image model file Q, a picture in which the online streamer 1 and the online streamer 2 perform PK by using an avatar, generates a second interaction video stream, and sends the second interaction video stream to the server.

7) The server determines a first audience client corresponding to the online streamer 1, and sends the first interaction video stream to the first audience client, so that the first audience client renders, based on the first interaction video stream, the picture in which the online streamer 1 and the online streamer 2 perform PK by using the avatar; and the server determines a second audience client corresponding to the online streamer 2, and sends the second interaction video stream to the second audience client, so that the second audience client renders, based on the second interaction video stream, the picture in which the online streamer 2 and the online streamer 1 perform PK by using the avatar.

In the image model file transmission method provided in this application, first, the image model file of the first online streamer that is sent by the first client is received. Then, the target key is obtained, and encryption processing is performed on the image model file based on the target key to obtain the encrypted image model file. If the interaction request for the first online streamer and the second online streamer is received, the encrypted image model file is sent to the second client based on the online streamer identifier of the second online streamer carried in the interaction request. When the decryption request sent by the second client is received, the target key is sent to the second client. The target key is used by the second client to decrypt the encrypted image model file to obtain the image model file. Encryption processing is performed on the image model file, so that all image model files stored in a memory are encrypted. This ensures that an online streamer image model file in the memory is not obtained and is securely used at the second client, effectively reduces a risk of leaking the online streamer image model file, and improves security of transmitting the image model file. Before receiving the interaction request, the server completes encryption of the image model file. In this way, instead of performing encryption after receiving the interaction request, the server may send the image model file to the second client in a timely manner after receiving the interaction request. Therefore, response efficiency of the second client can be improved, and an effect of responding in a timely manner can be achieved for livestreaming. In addition, instead of performing encryption after receiving the interaction request, the server performs encryption after receiving the image model file of the first online streamer. This may provide sufficient time for an encryption process, to perform encryption by selecting an encryption algorithm with a high encryption degree, so as to improve a difficulty of decrypting the image model file. Therefore, this further reduces a risk of leaking an online streamer image model file, and improves security of transmitting the image model file. The encrypted image model file and the target key are separately sent. Only when the second client sends the decryption request, the server sends the target key, to dynamically manage the target key, and further increase a difficulty of decrypting the image model file. In addition, the method provided in this application is easy to apply, to reduce transformation costs of each client.

This application further provides another image model file transmission method. The method is applied to a second client, and specifically includes the following steps:

Step B2: Receive an encrypted image model file sent by a server, where the encrypted image model file is obtained by the server by performing encryption processing on an image model file of a first online streamer based on a target key.

Specifically, the first online streamer is any online streamer. In some embodiments, the first online streamer is any online streamer who performs livestreaming by using an avatar or an image of an unreal person. A second online streamer is an online streamer who interacts with the first online streamer. It should be noted that there may be only one online streamer who interacts with the first online streamer, or may be a plurality of online streamers who interact with the first online streamer. When there are a plurality of online streamers who interact with the first online streamer, the second online streamer is any one of the online streamers who interact with the first online streamer. A first client is a client on which the first online streamer is located, namely, a first online streamer end. The second client is a client associated with the second online streamer, namely, a second client corresponding to the second online streamer, namely, a second online streamer end. The image model file is a resource such as a picture and a model used when an avatar of the first online streamer is constructed, namely, an online streamer image model file. A key is a parameter, and is a parameter that is input in an algorithm of converting a plaintext into a ciphertext or converting a ciphertext into a plaintext. The target key is a key for an image model file. The encrypted image model file is an image model file obtained after encryption, namely, an encrypted online streamer image model file. Encryption processing is a process of changing original information data by using a special algorithm.

In actual application, after receiving the image model file of the first online streamer that is sent by the first client, the server obtains the target key, and performs encryption processing on the image model file based on the target key to obtain the encrypted image model file. Then, after receiving an interaction request for the first online streamer and the second online streamer, the server determines, based on an online streamer identifier of the second online streamer in the interaction request, the second client corresponding to the second online streamer and an audience client corresponding to an audience watching the second online streamer, that is, determines the second client, and sends the encrypted image model file to the second client. In other words, the second client receives the encrypted image model file sent by the server.

It should be noted that, to avoid repeatedly receiving the encrypted image model file, before receiving the encrypted image model file sent by the server, the second client further needs to first check whether the encrypted image model file corresponding to the first online streamer is locally stored. If the encrypted image model file corresponding to the first online streamer is not locally stored, the second client requests the encrypted image model file from the server, and the server sends the encrypted image model file. In other words, before the encrypted image model file sent by the server is received, the method further includes:

querying whether the encrypted image model file is locally stored; and if the encrypted image model file is not locally stored, generating an encrypted image model file obtaining request, and sending the encrypted image model file obtaining request to the server.

In actual application, when interaction starts between the first online streamer and the second online streamer, the client on which the second online streamer is located, namely, the second client, locally queries whether the encrypted image model file is stored, for example, queries whether the encrypted image model file exists in a local cache or a memory. If the encrypted image model file is not stored, the second client generates the encrypted image model file obtaining request for the first online streamer, and then sends the encrypted image model file obtaining request to the server, so that the server sends, to the second client based on the encrypted image model file obtaining request, the encrypted image model file corresponding to the first online streamer. In other words, the second client receives the encrypted image model file sent by the server.

In addition, if determining, through query, that the encrypted image model file is locally stored, the second client needs to obtain the encrypted image model file from the server. In this case, the second client may generate a decryption request based on the encrypted image model file, and send the decryption request to the server. In other words, if the encrypted image model file is locally stored, the second client generates the decryption request based on the encrypted image model file, and sends the decryption request to the server.

For example, the first online streamer invites the second online streamer to live co-hosting. After the second online streamer receives the invitation, the second client on which the second online streamer is located queries whether the encrypted image model file corresponding to the first online streamer is locally stored. If the encrypted image model file corresponding to the first online streamer is locally stored, the second client generates the decryption request, and sends the decryption request to the server, that is, requests the target key from the server. If the encrypted image model file corresponding to the first online streamer is not locally stored, the second client generates the encrypted image model file obtaining request for the first online streamer, and sends the encrypted image model file obtaining request to the server, that is, requests the encrypted image model file from the server.

Step B4: Generate the decryption request based on the encrypted image model file, and send the decryption request to the server.

On the basis of receiving the encrypted image model file sent by the server, further, the second client generates the decryption request based on the encrypted image model file, and sends the decryption request to the server.

In actual application, after receiving the encrypted image model file, the second client extracts an identifier of the encrypted image model file, for example, a name and an identifier, generates the decryption request that carries the identifier of the encrypted image model file, and then sends the decryption request to the server, to request, from the server, the target key corresponding to the encrypted image model file.

Step B6: Decrypt the encrypted image model file based on the target key sent by the server based on the decryption request, to obtain the image model file.

On the basis of generating the decryption request based on the encrypted image model file and sending the decryption request to the server, further, the second client decrypts the encrypted image model file based on the target key fed back by the server.

In actual application, after receiving the decryption request, the server obtains, based on the identifier that is of the encrypted image model file and that is carried in the decryption request, the target key corresponding to the encrypted image model file, and then sends the target key to the second client. Then, the second client decrypts the encrypted image model file by using the target key, to obtain the image model file of the first online streamer.

It should be noted that, after obtaining the image model file of the first online streamer, the second client needs to render an image of the first online streamer at the second client based on the image model file, generate an interaction video stream, and send the interaction video stream to the server. In other words, after the encrypted image model file is decrypted based on the target key sent by the server based on the decryption request, to obtain the image model file, the method further includes:

rendering the image of the first online streamer based on the image model file; and generating the interaction video stream of the first online streamer and the second online streamer based on the image of the first online streamer and an image of the second online streamer, where the interaction video stream is used to display a picture in which the first online streamer interacts with the second online streamer.

Specifically, the interaction video stream is a video stream generated through interaction between the first online streamer and the second online streamer, and is used to display content of interaction between the first online streamer and the second online streamer.

In actual application, after the second client decrypts the encrypted image model file to obtain the image model file, the second client renders the dynamic image of the first online streamer at the second client based on the image model file, and generates, based on the image of the second online streamer, the interaction video stream in which the first online streamer interacts with the second online streamer. In other words, the picture in which the first online streamer interacts with the second online streamer is displayed at the second client. In this way, interaction ornamental value can be improved, and an interaction interest of an online streamer can be improved, to improve customer stickiness.

In addition, after the interaction video stream is generated, the interaction video stream further needs to be sent to the server. In other words, after the interaction video stream of the first online streamer and the second online streamer is generated based on the image of the first online streamer and the image of the second online streamer, the method further includes:

sending the interaction video stream to the server, where the interaction video stream is forwarded by the server to the audience client corresponding to the second online streamer.

In actual application, after generating the interaction video stream in which the first online streamer interacts with the second online streamer, the second client further needs to push the interaction video stream to the server. After receiving the interaction video stream, the server determines an audience identifier corresponding to the second online streamer, that is, determines an audience watching the second online streamer, and then sends the interaction video stream to an audience client on which the audience of the second online streamer is located, so that the audience client displays, based on the interaction video stream, a picture in which the first online streamer interacts with the second online streamer.

In an image model file download method provided in an embodiment of this application, the server includes a management area, a database, and a processing area. The second client determines a use scenario, that is, determines resolution of a display of a computer device corresponding to the second client, and then requests an encrypted image model file from the management area based on the use scenario. Then, the management area returns, based on the use scenario, a storage link corresponding to the use scenario, that is, returns the storage link of the encrypted image model file corresponding to the use scenario. Based on this, the second client requests the encrypted image model file based on the storage link, that is, requests the encrypted image model file from the database. Then, the database returns, to the second client, the encrypted image model file corresponding to the storage link. Then, the second client requests a target key from the management area based on the encrypted image model file. After the management area returns the target key, the second client performs decryption processing on the encrypted image model file based on the target key to obtain an image model file.

In another image model file download method provided in an embodiment of this application, the server includes an execution area (a general name of a management area and a processing area) and a database. The second client obtains a use scenario, that is, determines resolution of a display of a computer device corresponding to the second client, and then uploads the use scenario to the execution area, that is, requests an encrypted image model file from the execution area based on the use scenario. The execution area returns a storage link based on the use scenario, that is, returns the storage link of the encrypted image model file corresponding to the use scenario. Based on this, the second client requests the encrypted image model file based on the storage link, that is, requests the encrypted image model file from the database. Then, the database returns, to the second client, the encrypted image model file corresponding to the storage link, that is, returns the encrypted image model file. Then, the second client requests a target key from the execution area based on the encrypted image model file. The execution area determines the target key of the encrypted image model file, that is, the second client generates a second-client public key, adds the second-client public key to a decryption request, and sends the decryption request to the execution area. The execution area performs appropriateness verification based on the decryption request, that is, determines whether the decryption request meets a preset decryption rule, that is, determines, based on an interaction relationship between a user and a model owner, whether to return corresponding key information. If the decryption request meets the preset decryption rule, the execution area records use information, then encrypts the target key based on the second-client public key, and returns an encrypted target key. After receiving the encrypted target key, the second client obtains the target key through decryption based on a server public key, that is, decrypts the encrypted target key based on the server public key to obtain the target key. Then, the second client performs first decryption processing and second decryption processing on the encrypted image model file based on the target key to obtain an image model file. Subsequently, the second client performs rendering based on the image model file. After interaction ends, the second client clears a cached file (image model file) in a memory in a timely manner, that is, an online streamer is offline, deletes the image model file, and executes the process again during next use.

In the image model file transmission method provided in this application, the encrypted image model file sent by the server is received, where the encrypted image model file is obtained by the server by performing encryption processing on the image model file of the first online streamer based on the target key; the decryption request is generated based on the encrypted image model file, and the decryption request is sent to the server; and the encrypted image model file is decrypted based on the target key sent by the server based on the decryption request, to obtain the image model file. Encryption processing is performed on the image model file, so that all image model files stored in a memory are encrypted. This ensures that an online streamer image model file in the memory is not obtained and is securely used at the second client, effectively reduces a risk of leaking the online streamer image model file, and improves security of transmitting the image model file. Before receiving the interaction request, the server completes encryption of the image model file. In this way, instead of performing encryption after receiving the interaction request, the server may send the image model file to the second client in a timely manner after receiving the interaction request. Therefore, response efficiency of the second client can be improved, and an effect of responding in a timely manner can be achieved for livestreaming. In addition, instead of performing encryption after receiving the interaction request, the server performs encryption after receiving the image model file of the first online streamer. This may provide sufficient time for an encryption process, to perform encryption by selecting an encryption algorithm with a high encryption degree, so as to improve a difficulty of decrypting the image model file. Therefore, this further reduces a risk of leaking an online streamer image model file, and improves security of transmitting the image model file. The encrypted image model file and the target key are separately sent. Only when the second client sends the decryption request, the server sends the target key, to dynamically manage the target key, and further increase a difficulty of decrypting the image model file. In addition, the method provided in this application is easy to apply, to reduce transformation costs of each client.

The foregoing describes the schematic solution of the image model file transmission method applied to the second client in this embodiment. It should be noted that the technical solution of the image model file transmission method applied to the second client belongs to a same concept as the foregoing technical solution of the image model file transmission method applied to the server. For detailed content not described in detail in the technical solution of the image model file transmission method applied to the second client, refer to the descriptions in the technical solution of the image model file transmission method applied to the server.

Another embodiment of this application provides an online streamer image model file transmission method. The method is applied to a server, and specifically includes the following steps:

Step C2: Receive an online streamer image model file sent by a first online streamer end, and obtain a target obfuscation key and a target encryption type.

Specifically, the first online streamer end is a client on which a first online streamer is located, and may be any intelligent device such as a mobile phone, a tablet computer, and an intelligent computer. An online streamer, namely, an online live streamer, is a person who is responsible for a series of tasks such as planning, editing, recording, production, and audience interaction in an Internet program or activity, and serves as a host. The first online streamer end is a first client. The first online streamer is any online streamer. In some embodiments, the first online streamer is any online streamer who performs livestreaming by using an avatar or an image of an unreal person. The online streamer image model file is a file that includes attribute information required when an avatar of an online streamer corresponding to the online streamer is generated, namely, an image model file. For example, the online streamer image model file includes location information of an avatar A in a live scenario, action information of the avatar A, and the like. A key is a parameter that is input in an algorithm of converting a plaintext into a ciphertext or converting a ciphertext into a plaintext. The target obfuscation key is a key for encrypting the online streamer image model file of the first online streamer. Obfuscation is an encryption operation, for example, an operation of encrypting an online streamer image model file by using an exclusive OR operation as an encryption operation.

In actual application, the first online streamer end on which the first online streamer is located generates the online streamer image model file, and sends the online streamer image model file to the server. The online streamer image model file corresponding to the first online streamer end is stored in an online streamer image model file list. A to-be-encrypted online streamer image model file may be determined from the online streamer image model file list based on an actual service requirement. After the to-be-encrypted online streamer image model file is determined, a preset encryption algorithm is determined, and the target obfuscation key used to encrypt the online streamer image model file is determined based on the encryption algorithm.

Specifically, the method for obtaining the target obfuscation key includes:

determining a target encryption algorithm; and
generating the target obfuscation key based on the target encryption algorithm.

The target encryption algorithm is an algorithm for encrypting the online streamer image model file, for example, an encryption algorithm such as AES or DES. The target obfuscation key is a key randomly determined based on the target encryption algorithm.

In actual application, to improve security of transmitting the online streamer image model file, online streamer image model files may be encrypted by using different encryption algorithms. In other words, after the to-be-encrypted online streamer image model file is determined, the target encryption algorithm may be determined based on algorithm information pre-configured in a system, or an encryption algorithm is randomly determined for the to-be-encrypted online streamer image model file based on a preset algorithm selection rule, and is used as the target encryption algorithm for encrypting the online streamer image model file.

In a specific implementation of this application, that the target encryption algorithm is determined based on the algorithm information pre-configured in the system is used as an example. A to-be-encrypted online streamer image model file A is determined based on a service requirement, algorithm information (AES-GCM algorithm) pre-configured in the system is obtained, namely, a GCM encryption model in an AES algorithm, and the AES-GCM algorithm is used as a target encryption algorithm for encrypting the online streamer image model file A.

In another specific implementation of this application, that the encryption algorithm is randomly determined for the to-be-encrypted online streamer image model file based on the preset algorithm selection rule is used as an example. A to-be-encrypted online streamer image model file B is determined based on a service requirement. A preset algorithm selection rule is obtained, where the preset algorithm selection rule includes an encryption algorithm list including encryption algorithms that can be used to encrypt the online streamer image model file, and the encryption algorithm list includes an AES algorithm, a DES algorithm, and the like. The DES algorithm is randomly selected from the encryption algorithm list based on the preset algorithm selection rule. In this case, the DES algorithm is used as an encryption algorithm for encrypting the online streamer image model file.

The encryption algorithm of the to-be-encrypted online streamer image model file is randomly determined, so that corresponding obfuscation keys are determined based on different encryption algorithms, to help subsequently encrypt the online streamer image model file based on different encryption algorithms, so as to improve security of transmitting the online streamer image model file.

After the target encryption algorithm is determined, the target obfuscation key may be randomly generated based on the target encryption algorithm. For example, the AES encryption algorithm is determined, and a key length that may be supported by the AES encryption algorithm is 128 bits. In this case, a key with a corresponding bit quantity is randomly generated based on the AES algorithm, and is used as the target obfuscation key.

After the encryption algorithm for encrypting the online streamer image model file and the corresponding target obfuscation key are determined, a file encryption policy for encrypting the online streamer image model file further needs to be determined, namely, a target encryption type.

Specifically, the method for obtaining the target encryption type includes:

obtaining a preset selection rule; and
determining the target encryption type based on the preset selection rule.

The preset selection rule is a rule of selecting a file encryption policy of a to-be-encrypted online streamer image model file. The target encryption type is a target file encryption policy used when an online streamer image model file is encrypted. For example, an online streamer image model file A is encrypted by using a full encryption policy, that is, all bytes included in the online streamer image model file A are encrypted.

In actual application, to further enhance security of transmitting the online streamer image model file, different encryption algorithms may be used for online streamer image model files. In addition, the online streamer image model files may be encrypted by using different file encryption types. In other words, after the to-be-encrypted online streamer image model file is determined, the target encryption type may be determined based on encryption type information pre-configured in the system, or an encryption type is randomly selected for the to-be-encrypted online streamer image model file based on the preset selection rule, and is used as the target encryption type used when the online streamer image model file is encrypted.

In a specific implementation of this application, that the target encryption type is randomly selected for the to-be-encrypted online streamer image model file based on the preset selection rule is used as an example. A to-be-encrypted online streamer image model file B is determined. A preset selection rule is obtained, where the preset selection rule includes a file encryption type list, and a full encryption type is randomly selected from the file encryption type list. In this case, the full encryption type is used as a target encryption type for encrypting the online streamer image model file B.

It should be noted that, the online streamer image model file that includes the attribute information and that is sent by the first online streamer end is received. In addition, a resource file that includes a model picture may be further received. For the resource file that includes the model picture, a corresponding picture encryption method may be used to encrypt and transmit the resource file that includes the model picture, to provide multi-protection for the online streamer avatar file, and reduce a risk of transmitting the online streamer image model file.

In this application, different encryption algorithms, different obfuscation keys, and different encryption types are determined for different online streamer image model files, to help subsequently encrypt different online streamer image model files based on different encryption algorithms, different obfuscation keys, and different encryption types, and help subsequently minimize a loss of attacking the online streamer image model file.

Step C4: Determine a to-be-encrypted byte in the online streamer image model file based on the target encryption type, and encrypt the to-be-encrypted byte based on the target obfuscation key, to obtain an encrypted online streamer image file.

Specifically, after the target obfuscation key and the target encryption type that are used to encrypt the to-be-encrypted online streamer image model file are determined, the online streamer image model file may be encrypted based on the target obfuscation key and the target encryption type, to obtain the encrypted online streamer image file obtained through encryption.

In actual application, to meet an actual service requirement and improve encryption efficiency, before encryption processing is performed on the online streamer image model file based on the target obfuscation key and the target encryption type, the method further includes:
  receiving an online streamer image model file encryption request, where the online streamer image model file encryption request includes service requirement information; and
  in response to the online streamer image model file encryption request, traversing a model file list corresponding to the first online streamer end, and determining an online streamer image model file that meets the service requirement information and that is in the model file list.

The online streamer image model file encryption request is a request for encrypting a to-be-encrypted online streamer image model file. The model file list is a list including at least one online streamer image model file corresponding to the first online streamer.

Specifically, each online streamer end has a corresponding model file list, and each model file list includes a plurality of online streamer image model files. To improve efficiency of transmitting the online streamer image model file, the to-be-encrypted online streamer image model file may be determined, for encryption, based on the service requirement information in the encryption request.

In a specific implementation of this application, an online streamer image model file A is used as an example. After receiving an online streamer image model file encryption request, in response to the encryption request, the server traverses a model file list corresponding to an online streamer end, and determines, as a to-be-encrypted online streamer image model file based on location requirement information carried in the encryption request, the online streamer image model file A that is in the model file list and that carries the location information.

Based on the service requirement information in the encryption request, the to-be-encrypted online streamer image model file is determined from the model file list, that is, the determined online streamer image model file is only encrypted subsequently, to improve efficiency of encrypting the online streamer image model file.

After the to-be-encrypted online streamer image model file and the target obfuscation key and the target encryption type of the online streamer image model file are determined, the online streamer image model file is encrypted based on the target obfuscation key and the target encryption type.

In actual application, a method for performing encryption processing on the online streamer image model file based on the target obfuscation key and the target encryption type, to obtain the encrypted online streamer image file may include:

C4-1-2. If the target encryption type is a prefix encryption type, determine ciphertext length information based on file attribute information of the online streamer image model file.

The prefix encryption type is an encryption policy for encrypting some bytes in the online streamer image model file. The file attribute information is a size of the online streamer image model file. For example, attribute information of an online streamer image model file A is that a size of the file is 3 K. The ciphertext length information is a length of a byte that needs to be encrypted in the online streamer image model file.

Specifically, that the size of the online streamer image model file is 10 bytes is used as an example. When a value obtained after 2 is raised to the power N is greater than 10, a value of N is used as the ciphertext length information, for example, the ciphertext length information is 4 bytes.

C4-1-4. Determine a to-be-encrypted byte and a plaintext byte in the online streamer image model file based on the ciphertext length information.

The to-be-encrypted byte is a byte that needs to be encrypted in the online streamer image model file. The plaintext byte is byte that does not need to be encrypted in the online streamer image model file.

Specifically, the foregoing example is still used, where 4 bytes are determined, as to-be-encrypted bytes to be subsequently encrypted, from the online streamer image model file based on the ciphertext length information (4 bytes). In this case, the remaining 6 bytes are plaintext bytes.

C4-1-6. Encrypt the to-be-encrypted byte based on the target obfuscation key to obtain an encrypted ciphertext.

The encrypted ciphertext is an encrypted byte obtained by encrypting the to-be-encrypted byte based on the obfuscation key.

Specifically, the foregoing example is still used, where 4 to-be-encrypted bytes are encrypted based on the target obfuscation key to obtain a 4-byte encrypted ciphertext.

C4-1-8. Generate the encrypted online streamer image file based on the encrypted ciphertext, the plaintext byte, and the ciphertext length information.

The encrypted online streamer image file is a file obtained by encrypting the online streamer image model file.

Specifically, the foregoing example is still used, where the ciphertext length information, the encrypted ciphertext, and the plaintext byte are encapsulated to obtain the encrypted online streamer image file.

The online streamer image model file is encrypted by using the prefix encryption type and the target obfuscation key, that is, the online streamer image model file is encrypted by using a random encryption algorithm and a file encryption policy, to improve security of transmitting the online streamer image model file.

In actual application, a method for performing encryption processing on the online streamer image model file based on the target obfuscation key and the target encryption type, to obtain the encrypted online streamer image file may include:

C4-2-2. If the target encryption type is a segmented encryption type, determine at least two byte segments in the online streamer image model file based on a preset segmentation rule, where each byte segment includes a to-be-encrypted byte and a plaintext byte.

The segmented encryption type is an encryption policy for encrypting the byte segment in the online streamer image model file. The preset segmentation rule is a rule for obtaining at least two byte segments by segmenting the online streamer image model file. A specific rule may be that M bytes are selected at an interval of N bytes for encryption, where M and N are positive integers, and are not equal to 0. If Q bytes are remained through segmentation and Q is less than M, the remaining Q bytes may be form one byte segment. The byte segment is a byte segment including some bytes in the online streamer image model file. For example, 5 consecutive bytes are determined, the first 3 bytes are to-be-encrypted bytes, the last 2 bytes are plaintext bytes, and the 5 bytes form one byte segment.

Specifically, an online streamer image model file B is used as an example. It is determined that content of the preset segmentation rule is to select 2 bytes at an interval of 3 bytes. In this case, the online streamer image model file is segmented based on the preset segmentation rule to obtain a plurality of byte segments. Each byte segment includes 3 to-be-encrypted bytes and 2 plaintext bytes.

C4-2-4. Encrypt the to-be-encrypted byte in each byte segment based on the target obfuscation key to obtain an encrypted ciphertext, and count a quantity of encrypted ciphertexts.

Each byte segment includes a to-be-encrypted byte. Each byte segment is cyclically read, and the to-be-encrypted byte in the byte segment is encrypted to obtain the encrypted ciphertext. When each byte segment includes an encrypted byte, a quantity of ciphertexts is a quantity of byte segments in the online streamer image model file.

Specifically, the foregoing example is still used, where the to-be-encrypted byte in each byte segment is cyclically read, and the to-be-encrypted byte in each byte segment is encrypted based on the target obfuscation key to obtain an encrypted ciphertext. In addition, a quantity of encrypted ciphertexts is counted.

C4-2-6. Generate the encrypted online streamer image file based on the encrypted ciphertext and the plaintext byte in each byte segment and the quantity of ciphertexts.

Specifically, the following example is still used, where the encrypted ciphertext and the plaintext byte in each byte segment, the counted quantity of ciphertexts, a separator are encapsulated to obtain the encrypted online streamer image file, and a specific manner is performing storage in a storage manner in which the encrypted ciphertexts are stored in rows and the plaintext bytes are continuously stored. The separator is a separation length determined based on a length of the encrypted ciphertext.

The online streamer image model file is encrypted by using the segmented encryption type and the target obfuscation key, that is, the image model file is encrypted by using a random encryption algorithm and a file encryption policy, to improve security of transmitting the online streamer image model file.

In actual application, a method for performing encryption processing on the online streamer image model file based on the target obfuscation key and the target encryption type, to obtain the encrypted online streamer image file may include:

C4-3-2. If the target encryption type is a full encryption type, use each byte in the online streamer image model file as a to-be-encrypted byte, and encrypt the to-be-encrypted byte based on the target obfuscation key, to obtain an encrypted ciphertext.

The full encryption type is an encryption policy for encrypting all bytes in the online streamer image model file.

Specifically, an online streamer image model file C is used as an example. A to-be-encrypted byte in the online streamer image model file C is determined, and the to-be-encrypted byte is encrypted based on the target obfuscation key, to obtain an encrypted ciphertext.

C4-3-4. Generate the encrypted online streamer image file based on the encrypted ciphertext.

Specifically, the foregoing example is still used, where the encrypted ciphertext is encapsulated to obtain the encrypted online streamer image file.

The online streamer image model file is encrypted by using the full encryption type and the target obfuscation key, that is, the online streamer image model file is encrypted by using a random encryption algorithm and a file encryption policy, to improve security of transmitting the online streamer image model file.

In actual application, in addition to the foregoing file encryption type, the online streamer image model file may be encrypted by using another file encryption type. This is not specifically limited in this application, and a file encryption type that can be used to encrypt the to-be-encrypted online streamer image model file may be used.

After an encryption manner of the to-be-encrypted online streamer image model file is determined, a mapping relationship between the encryption manner and an encrypted file is established, and is stored into a database through serialization, to help subsequently determine how to decrypt the online streamer image model file. Specifically, the encryption manner includes an encryption type, an encryption algorithm, and an obfuscation key.

The online streamer image model file is encrypted by using a randomly determined obfuscation key and a randomly determined encryption type, to help improve security of subsequently transmitting the online streamer image model file.

Step C6: Receive an interaction request for the first online streamer end and a second online streamer end, and send the encrypted online streamer image file to the second online streamer end based on the interaction request.

Specifically, the interaction request is a request generated based on a requirement of interaction between two online streamers, and may be a co-hosting request, a player killing (pk) request, or the like. The second online streamer end is a client on which a second online streamer is located, and may be any intelligent device such as a mobile phone, a tablet computer, and an intelligent computer, or may be a client corresponding to an audience of the second online streamer, namely, a second client. The second online streamer is an online streamer who interacts with the first online streamer.

In actual application, after the server receives a request that is sent by the first online streamer end and that is used to interact with the second online streamer end, or receives a request that is sent by the second online streamer end and that is used to interact with the first online streamer end, that is, after the server receives the interaction request for the first online streamer end and the second online streamer end, the server determines, based on an online streamer identifier of the second online streamer in the interaction request, the second online streamer end corresponding to the second online streamer and an audience client corresponding to the audience watching the second online streamer, and sends the encrypted online streamer image file and the target obfuscation key to the second online streamer end. Then, the second online streamer end decrypts the encrypted online streamer image file based on the target obfuscation key to obtain the online streamer image model file of the first online streamer, and then renders and displays an avatar of the first online streamer at the second online streamer end based on the online streamer image model file of the first online streamer.

It should be noted that, to ensure security of transmitting the online streamer image model file, the server sends the encrypted online streamer image file and the target obfuscation key to the second online streamer end two times: First, when receiving the interaction request for the first online streamer end and the second online streamer end, the server sends, based on the online streamer identifier of the second online streamer in the interaction request, the encrypted online streamer image file to the second online streamer end associated with the second online streamer. Then, after receiving the encrypted online streamer image file, the second online streamer end requests the target obfuscation key from the server. In this case, the server sends the target obfuscation key to a target client. To improve key transmission security, a transmission connection used to transmit a key may be established based on a key transmission protocol (such as the ECDH protocol). Before sending the target obfuscation key to the second online streamer end, the server further needs to record file use information of the second online streamer end. The file use information includes at least one of a user identifier, a use scenario, a use range, a used file identifier, and a use time that correspond to the second online streamer end. In this way, traceability of use of the target obfuscation key can be implemented, and a leakage path can be traced, to provide clues and data support for recovery after an unfortunate loss.

In the online streamer image model file transmission method applied to live co-hosting in this application, the online streamer image model file sent by the first online streamer end is received, and the target obfuscation key and the target encryption type are obtained; the to-be-encrypted byte in the online streamer image model file is determined based on the target encryption type, and the to-be-encrypted byte is encrypted based on the target obfuscation key, to obtain the encrypted online streamer image file; and the interaction request for the first online streamer end and the second online streamer end is received, and the encrypted online streamer image file is sent to the second online streamer end based on the interaction request. The online streamer image model file is encrypted by using the target obfuscation key and the target encryption type, to ensure that the online streamer image model file is not easily obtained, effectively reduce a risk of leaking the online streamer image model file, and improve security of transmitting the online streamer image model file.

This application further provides another online streamer image model file transmission method. The method is applied to a second online streamer end, and specifically includes the following steps:

Step D2: Receive an encrypted online streamer image file and a target obfuscation key that are sent by a server.

Specifically, the second online streamer end is a client on which a second online streamer is located, and may be any intelligent device such as a mobile phone, a tablet computer, and an intelligent computer, or may be a client corresponding to an audience of the second online streamer, namely, a second client. The encrypted online streamer image file is a file obtained by performing encryption processing on an online streamer image model file. The target obfuscation key is a key for encrypting the online streamer image model file, and may be a string such as a combination of at least one of a number, a letter, and a symbol, or may be in a form of a matrix or an array. A first online streamer end is a first client, namely, a client corresponding to a first online streamer. The second online streamer end is the second client, namely, a client corresponding to the second online streamer end.

In actual application, after receiving an online streamer image model file of the first online streamer that is sent by the first online streamer end, the server obtains the target obfuscation key and a target encryption type, and performs encryption processing on the image model file based on the target obfuscation key and the target encryption type to obtain the encrypted online streamer image file. Then, after receiving an interaction request for the first online streamer end and the second online streamer end, the server determines, based on an online streamer identifier of the second online streamer in the interaction request, the second client corresponding to the second online streamer or the client corresponding to the audience of the second online streamer, namely, the second online streamer end, and sends the encrypted online streamer image file and the target obfuscation key to the second online streamer end. In other words, the second online streamer end receives the encrypted online streamer image file and the target obfuscation key that are sent by the server.

Step D4: Determine a target encryption type of the encrypted online streamer image file based on the encrypted online streamer image file.

Specifically, after receiving the encrypted online streamer image file, the server parses the encrypted online streamer image file to determine the encryption type of the encrypted online streamer image file, for example, parses the encrypted online streamer image file to determine that the encrypted online streamer image file does not include a plaintext byte, so as to determine that the target encryption type corresponding to the encrypted online streamer image file is a full encryption type.

Step D6: Perform decryption processing on the encrypted online streamer image file based on the target obfuscation key and the target encryption type, to obtain the online streamer image model file.

In actual application, a method for performing decryption processing on the encrypted online streamer image file based on the target obfuscation key and the target encryption type, to obtain the online streamer image model file may include:

if the target encryption type is a prefix encryption type, obtaining ciphertext length information in the encrypted online streamer image file;

determining an encrypted ciphertext and a plaintext byte in the encrypted online streamer image file based on the ciphertext length information, and performing decryption processing on the encrypted ciphertext based on the target obfuscation key, to obtain a to-be-encrypted byte; and obtaining the online streamer image model file based on the to-be-encrypted byte and the plaintext byte.

For example, if it is determined that a target encryption type of an encrypted online streamer image file A is a prefix encryption type, ciphertext length information (10 bytes) in the encrypted online streamer image file A is obtained. A 10-byte encrypted ciphertext in the encrypted online streamer image file A is determined based on the ciphertext length information (10 bytes). The encrypted ciphertext is decrypted based on the target obfuscation key, to obtain a decrypted byte. The decrypted byte is combined with a plaintext byte to obtain an online streamer image model file.

In actual application, a method for performing decryption processing on the encrypted online streamer image file based on the target obfuscation key and the target encryption type, to obtain the online streamer image model file may include:

if the target encryption type is a segmented encryption type, obtaining a quantity of ciphertexts in the encrypted online streamer image file;

determining a byte segment in the encrypted online streamer image file based on the quantity of ciphertexts, and decrypting an encrypted ciphertext in each byte segment based on the target obfuscation key, to obtain a to-be-encrypted byte and a plaintext byte; and obtaining the online streamer image model file based on the to-be-encrypted byte and the plaintext byte.

For example, if it is determined that a target encryption type of an encrypted online streamer image file B is segmented encryption, a quantity of ciphertexts in the encrypted online streamer image file B is obtained. A byte segment in the encrypted online streamer image file B is determined based on the quantity of ciphertexts, and an encrypted ciphertext in each byte segment is decrypted based on a target obfuscation key, to obtain a decrypted byte. A separator in the encrypted online streamer image file B is determined, and the decrypted byte obtained in each byte segment is inserted into a corresponding separator region, so that the decrypted byte and a plaintext byte are encapsulated to obtain an online streamer image model file.

In actual application, a method for performing decryption processing on the encrypted online streamer image file based on the target obfuscation key and the target encryption type, to obtain the online streamer image model file may include:

if the target encryption type is a full encryption type, decrypting an encrypted ciphertext in the encrypted online streamer image file based on the target obfuscation key, to obtain a to-be-encrypted byte; and obtaining the online streamer image model file based on the to-be-encrypted byte.

For example, if it is determined that a target encryption type of an encrypted online streamer image file C is full encryption, an encrypted ciphertext in the encrypted online streamer image file C is decrypted based on a target obfuscation key, to obtain a decrypted byte, and the decrypted byte forms an online streamer image model file.

In the online streamer image model file transmission method applied to the second online streamer end in this application, the encrypted online streamer image file and the target obfuscation key that are sent by the server are received; the target encryption type of the encrypted online streamer image file is determined based on the encrypted online streamer image file; and decryption processing is performed on the encrypted online streamer image file based on the target obfuscation key and the target encryption type, to obtain the online streamer image model file. The encrypted online streamer image file obtained by encrypting the online streamer image model file based on the target obfuscation key and the target encryption type is decrypted, to ensure that the online streamer image model file is not easily obtained, effectively reduce a risk of leaking the online streamer image model file, and improve security of transmitting the online streamer image model file.

Figure 6:
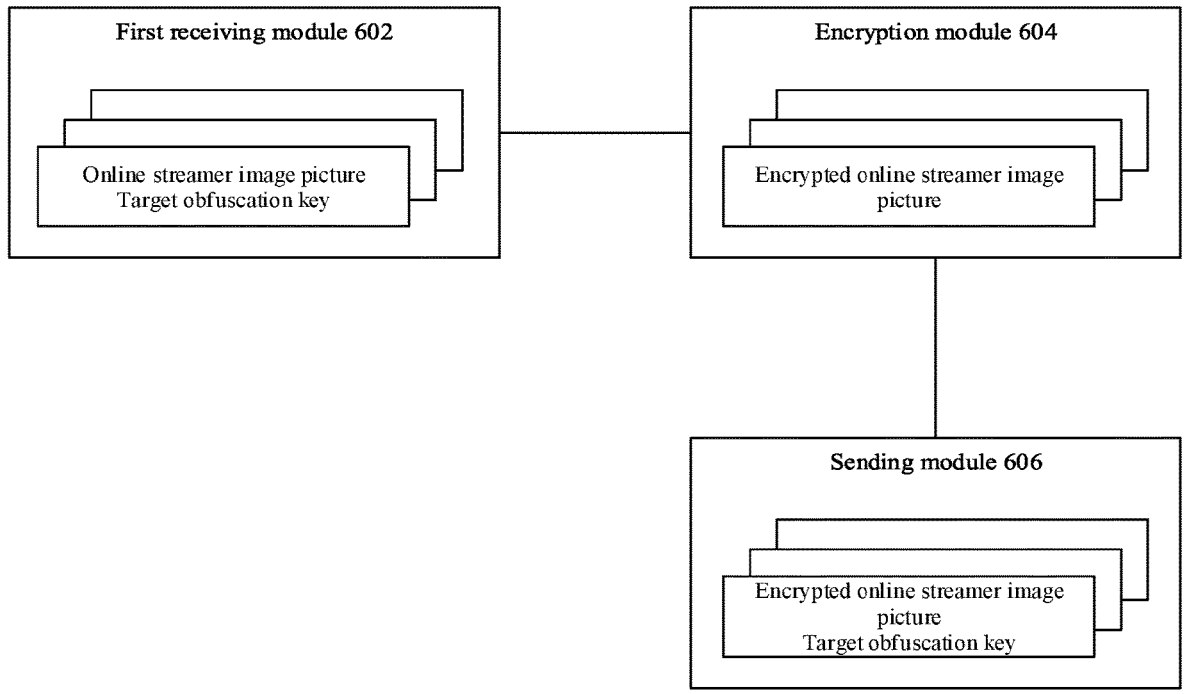
FIG. 6 is a schematic diagram of a structure of an online streamer image picture transmission apparatus in live interaction according to an embodiment of this application.

Corresponding to the foregoing method embodiments, this application further provides an embodiment of an online streamer image picture transmission apparatus in live interaction. FIG. 6 is a schematic diagram of a structure of an online streamer image picture transmission apparatus in live interaction according to an embodiment of this application. As shown in FIG. 6, the apparatus includes:

a first receiving module 602, configured to: receive an online streamer image picture sent by a first online streamer end, and obtain a target obfuscation key;

an encryption module 604, configured to perform encryption processing on the online streamer image picture based on the target obfuscation key and picture information of the online streamer image picture, to obtain an encrypted online streamer image picture; and a sending module 606, configured to: if a live interaction request for the first online streamer end and a second online streamer end is received, send the encrypted online streamer image picture and the target obfuscation key to the second online streamer end.

In some embodiments, the first receiving module 602 is further configured to:

obtain an initial obfuscation key; and perform preset bitwise operation processing on the initial obfuscation key to obtain the target obfuscation key.

In some embodiments, the first receiving module 602 is further configured to:

for any bit in the initial obfuscation key, perform randomization processing on a value of the bit by using a preset random algorithm, to obtain a new value of the bit; and generate the target obfuscation key based on a new value of each bit.

In some embodiments, the picture information includes a color value of each pixel in the online streamer image picture.

The encryption module 604 is further configured to:

perform encryption processing on the color value of each pixel based on the target obfuscation key, to obtain an encrypted color value of each pixel; and generate the encrypted online streamer image picture based on each encrypted color value.

In some embodiments, the color value includes transparency and a chrominance value.

The encryption module 604 is further configured to:

starting from an $i^{th}$ pixel in the online streamer image picture, perform an exclusive OR operation on transparency of the $i^{th}$ pixel in the online streamer image picture and a value of a $(2i-1)^{th}$ bit in the target obfuscation key to obtain encrypted transparency of the $i^{th}$ pixel, where $i=1$;

perform an exclusive OR operation on a chrominance value of the $i^{th}$ pixel in the online streamer image picture and a value of a $(2i)^{th}$ bit in the target obfuscation key to obtain an encrypted chrominance value of the $i^{th}$ pixel;

obtain an encrypted color value of the $i^{th}$ pixel based on the encrypted transparency and the encrypted chrominance value of the $i^{th}$ pixel;

determine whether the $i^{th}$ pixel in the online streamer image picture is the last pixel; and if the $i^{th}$ pixel in the online streamer image picture is not the last pixel, increase i by 1, and return to the step of performing an exclusive OR operation on transparency of the $i^{th}$ pixel in the online streamer image picture and a value of a $(2i-1)^{th}$ bit in the target obfuscation key.

In some embodiments, the color value includes transparency, a first chrominance value, a second chrominance value, and a third chrominance value.

The encryption module 604 is further configured to:

starting from a $j^{th}$ pixel in the online streamer image picture, perform an exclusive OR operation on transparency of the $j^{th}$ pixel in the online streamer image picture and a value of a $(4j-3)^{th}$ bit in the target obfuscation key to obtain encrypted transparency of the $i^{th}$ pixel, where $j=1$;

perform an exclusive OR operation on a first chrominance value of the $j^{th}$ pixel in the online streamer image picture and a value of a $(4j-2)^{th}$ bit in the target obfuscation key to obtain an encrypted first chrominance value of the $i^{th}$ pixel;

perform an exclusive OR operation on a second chrominance value of the $j^{th}$ pixel in the online streamer image picture and a value of a $(4j-1)^{th}$ bit in the target obfuscation key to obtain an encrypted second chrominance value of the $i^{th}$ pixel;

perform an exclusive OR operation on a third chrominance value of the $j^{th}$ pixel in the online streamer image picture and a value of a $(4j)^{th}$ bit in the target obfuscation key to obtain an encrypted third chrominance value of the $i^{th}$ pixel;

obtain an encrypted color value of the $i^{th}$ pixel based on the encrypted transparency, the encrypted first chrominance value, the encrypted second chrominance value, and the encrypted third chrominance value of the $j^{th}$ pixel;

determine whether the $i^{th}$ pixel in the online streamer image picture is the last pixel; and if the $j^{th}$ pixel in the online streamer image picture is not the last pixel, increase j by 1, and return to the step of performing an exclusive OR operation on transparency of the $j^{th}$ pixel in the online streamer image picture and a value of a $(4j-1)^{th}$ bit in the target obfuscation key.

In the online streamer image picture transmission apparatus in live interaction provided in this application, the online streamer image picture sent by the first online streamer end is received, and the target obfuscation key is obtained; encryption processing is performed on the online streamer image picture based on the target obfuscation key and the picture information of the online streamer image picture, to obtain the encrypted online streamer image picture; and if the live interaction request for the first online streamer end and the second online streamer end is received, the encrypted online streamer image picture and the target obfuscation key are sent to the second online streamer end. Encryption processing is performed on the online streamer image picture by using the target obfuscation key and the picture information of the online streamer image picture, so that all online streamer image pictures stored in a memory are encrypted. This ensures that the online streamer image picture in the memory is not obtained and is securely used at the second online streamer end, effectively reduces a risk of leaking the online streamer image picture, and improves security of transmitting the online streamer image picture. Before receiving the live interaction request, the server completes encryption of the online streamer image picture. In this way, instead of performing encryption after receiving the live interaction request, the server may send the encrypted online streamer image picture to the second online streamer end in a timely manner after receiving the live interaction request. Therefore, response efficiency of the second online streamer end can be improved, and an effect of responding in a timely manner can be achieved for livestreaming. In addition, instead of performing encryption after receiving the live interaction request, the server performs encryption after receiving the online streamer image picture of the first online streamer. This may provide sufficient time for an encryption process, to perform encryption by selecting a target obfuscation key with a high encryption degree, so as to improve a difficulty of decrypting the encrypted online streamer image picture. Therefore, this further reduces a risk of leaking the online streamer image picture, and improves security of transmitting the online streamer image picture. In addition, the method provided in this application is easy to apply, to reduce transformation costs of each client.

The foregoing describes the schematic solution of the online streamer image picture transmission apparatus in live interaction applied to the server in this embodiment. It should be noted that the technical solution of the online streamer image picture transmission apparatus in live interaction applied to the server belongs to a same concept as the foregoing technical solution of the online streamer image picture transmission method in live interaction applied to the server. For detailed content not described in detail in the technical solution of the online streamer image picture transmission apparatus in live interaction applied to the server, refer to the descriptions in the technical solution of the online streamer image picture transmission method in live interaction applied to the server.

Figure 7:
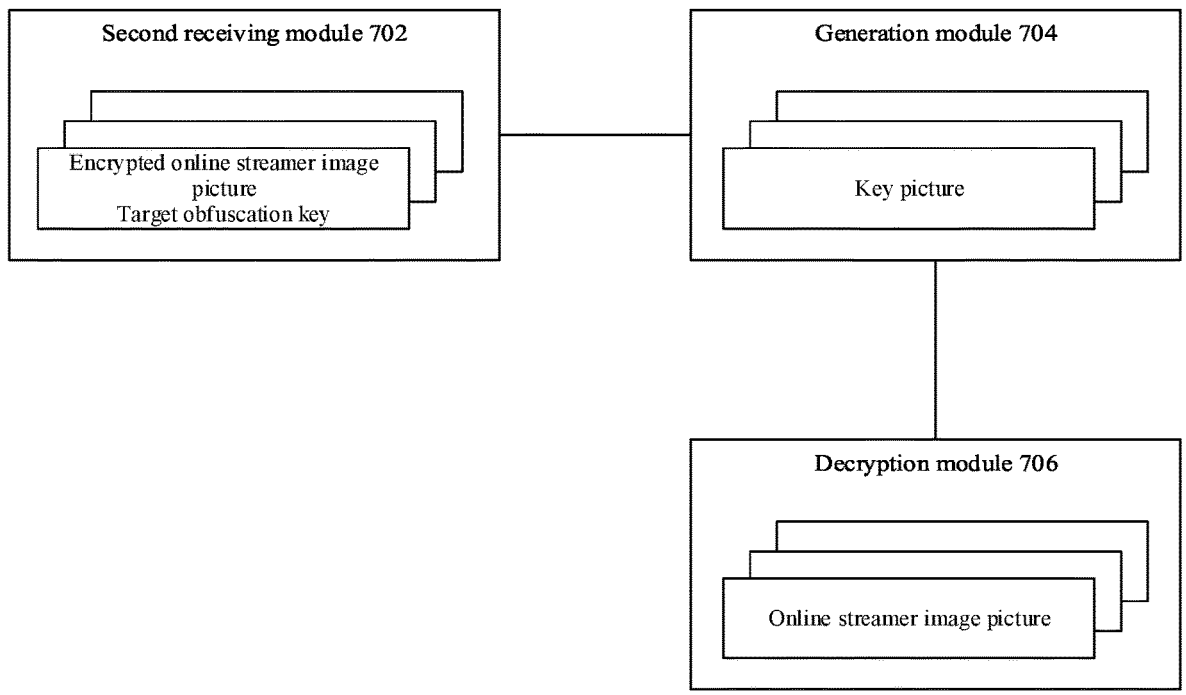
FIG. 7 is a schematic diagram of a structure of another online streamer image picture transmission apparatus in live interaction according to an embodiment of this application.

Corresponding to the foregoing method embodiments, this application further provides an embodiment of an online streamer image picture transmission apparatus in live interaction. FIG. 7 is a schematic diagram of a structure of another online streamer image picture transmission apparatus in live interaction according to an embodiment of this application. As shown in FIG. 7, the apparatus includes:

a second receiving module 702, configured to receive an encrypted online streamer image picture and a target obfuscation key that are sent by a server, where the encrypted online streamer image picture is obtained by the sever by performing encryption processing on an online streamer image picture based on the target obfuscation key and picture information of the online streamer image picture sent by a first online streamer end;

a generation module 704, configured to generate, based on the target obfuscation key, a key picture corresponding to the encrypted online streamer image picture; and a decryption module 706, configured to perform decryption processing on the encrypted online streamer image picture based on the key picture, to obtain the online streamer image picture.

In the online streamer image picture transmission apparatus in live interaction provided in this application, the encrypted online streamer image picture and the target obfuscation key that are sent by the server are first received, where the encrypted online streamer image picture is obtained by the server by performing encryption processing on the online streamer image picture based on the target obfuscation key and the picture information of the online streamer image picture sent by the first online streamer end; the key picture corresponding to the encrypted online streamer image picture is generated based on the target obfuscation key; and decryption processing is performed on the encrypted online streamer image picture based on the key picture, to obtain the online streamer image picture. Encryption processing is performed on the online streamer image picture by using the target obfuscation key and the picture information of the online streamer image picture, so that all online streamer image pictures stored in a memory are encrypted. This ensures that the online streamer image picture in the memory is not obtained and is securely used at the second online streamer end, effectively reduces a risk of leaking the online streamer image picture, and improves security of transmitting the online streamer image picture. Before receiving the live interaction request, the server completes encryption of the online streamer image picture. In this way, instead of performing encryption after receiving the live interaction request, the server may send the encrypted online streamer image picture to the second online streamer end in a timely manner after receiving the live interaction request. Therefore, response efficiency of the second online streamer end can be improved, and an effect of responding in a timely manner can be achieved for livestreaming. In addition, instead of performing encryption after receiving the live interaction request, the server performs encryption after receiving the online streamer image picture of the first online streamer. This may provide sufficient time for an encryption process, to perform encryption by selecting a target obfuscation key with a high encryption degree, so as to improve a difficulty of decrypting the encrypted online streamer image picture. Therefore, this further reduces a risk of leaking the online streamer image picture, and improves security of transmitting the online streamer image picture. In addition, the method provided in this application is easy to apply, to reduce transformation costs of each client.

The foregoing describes the schematic solution of the online streamer image picture transmission apparatus in live interaction applied to the second online streamer end in this embodiment. It should be noted that the technical solution of the online streamer image picture transmission apparatus in live interaction applied to the second online streamer end belongs to a same concept as the foregoing technical solution of the online streamer image picture transmission method in live interaction applied to the second online streamer end. For detailed content not described in detail in the technical solution of the online streamer image picture transmission apparatus in live interaction applied to the second online streamer end, refer to the descriptions in the technical solution of the online streamer image picture transmission method in live interaction applied to the second online streamer end.

Figure 8:
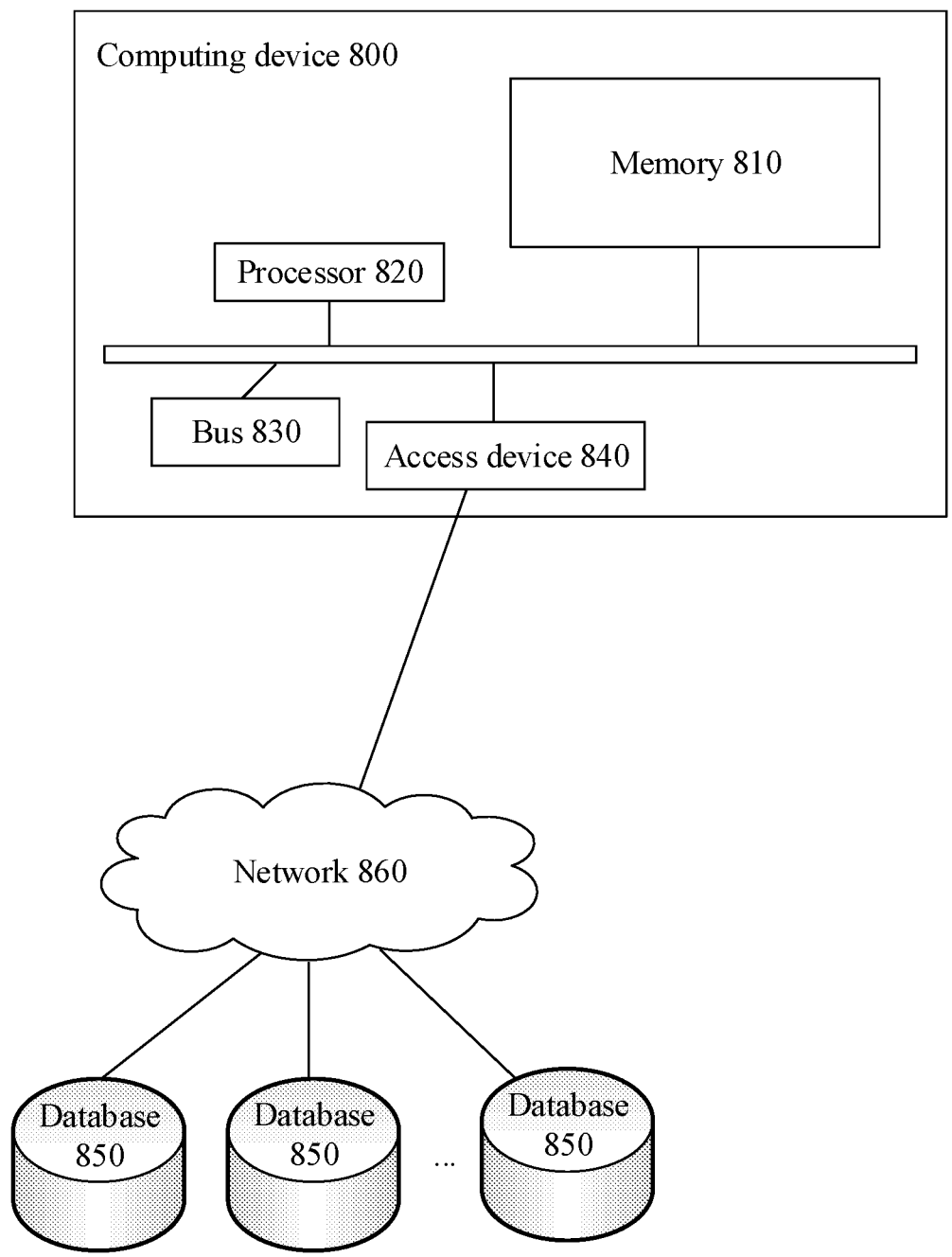
FIG. 8 is a block diagram of a structure of a computing device according to an embodiment of this application.

FIG. 8 is a block diagram of a structure of a computing device 800 according to an embodiment of this application. Components of the computing device 800 include but are not limited to a memory 810 and a processor 820. The processor 820 and the memory 810 are connected by using a bus 830, and a database 850 is configured to store data.

The computing device 800 further includes an access device 840, and the access device 840 enables the computing device 800 to perform communication by using one or more networks 860. Examples of these networks include a public switched telephone network (PSTN), a local area network (LAN), a wide area network (WAN), a personal area network (PAN), or a combination of communication networks such as the Internet. The access device 840 may include one or more of any types of wired or wireless network interfaces (for example, a network interface controller (NIC)), for example, an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this application, the foregoing components of the computing device 800 and other components not shown in FIG. 8 may also be connected to each other, for example, by using the bus. It should be understood that the block diagram of the structure of the computing device shown in FIG. 8 is merely used as an example instead of a limitation on the scope of this application. A person skilled in the art may add or substitute other components as required.

The computing device 800 may be any type of still or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a still computing device such as a desktop computer or a personal computer (PC). The computing device 800 may be a mobile or still server.

When executing computer instructions, the processor 820 implements steps of the method for transmitting an online streamer image picture in live interaction.

The foregoing describes the schematic solution of the computing device in this embodiment. It should be noted that the technical solution of the computing device belongs to a same concept as the foregoing technical solution of the online streamer image picture transmission method in live interaction. For detailed content not described in detail in the technical solution of the computing device, refer to the technical solution of the online streamer image picture transmission method in live interaction.

An embodiment of this application further provides a computer-readable storage medium that stores computer instructions. When the computer instructions are executed by a processor, steps of the online streamer image picture transmission method in live interaction are implemented.

The foregoing describes the schematic solution of the computer-readable storage medium in this embodiment. It should be noted that the technical solution of the storage medium belongs to a same concept as the technical solution of the online streamer image picture transmission method in live interaction. For detail content not described in detail in the technical solution of the storage medium, refer to the technical solution of the online streamer image picture transmission method in live interaction.

Specific embodiments of this application are described above. Other embodiments fall within the scope of the appended claims. In some situations, the actions or steps recorded in the claims can be performed in an order different from the order in the embodiments and the desired results can still be achieved. In addition, the process depicted in the accompanying drawings does not necessarily require the shown particular execution order to achieve the desired results. In some implementations, multi-tasking and parallel processing can or may be advantageous.

The computer instructions include computer program code, which may be in a source code form, an object code form, an executable file, an intermediate form, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program code.

It is worthwhile to note that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in the specification are all preferred embodiments, and involved actions and modules are not necessarily mandatory to this application.

In the foregoing embodiments, descriptions of the embodiments have respective focuses. For a part that is not described in detail in an embodiment, references can be made to related descriptions in another embodiment.

The preferred embodiments of this application disclosed above are merely intended to help describe this application. The optional embodiments do not describe all details, and the present invention is not limited to the specific implementations. Clearly, many modifications and changes may be made based on the content of this application. The embodiments are selected and specifically described in this application to better explain the principle and actual application of this application, so that a person skilled in the art can better understand and use this application. This application is only subjected to the claims and the scope and equivalents thereof

What is claimed is:

1. A method, applied to a server, the method comprising:
receiving an online streamer image picture sent by a first online streamer end, and obtaining a target obfuscation key;
performing encryption processing on the online streamer image picture based on the target obfuscation key and picture information of the online streamer image picture comprising a color value of each pixel in the online streamer image picture, to obtain an encrypted online streamer image picture, comprising:
performing encryption processing on the color value of each pixel based on the target obfuscation key, to obtain an encrypted color value of each pixel; and
generating the encrypted online streamer image picture based on each encrypted color value; and
in response to determining that a live interaction request for the first online streamer end and a second online streamer end is received, sending the encrypted online streamer image picture and the target obfuscation key to the second online streamer end.

2. The method according to claim 1, wherein the obtaining the target obfuscation key comprises:
obtaining an initial obfuscation key; and
performing preset bitwise operation processing on the initial obfuscation key to obtain the target obfuscation key.

3. The method according to claim 2, wherein the performing the preset bitwise operation processing on the initial obfuscation key to obtain the target obfuscation key comprises:
for any bit in the initial obfuscation key, performing randomization processing on a value of the bit by using a preset random algorithm, to obtain a new value of the bit; and
generating the target obfuscation key based on the new value of each bit.

4. The method according to claim 1, wherein the color value comprises transparency and a chrominance value; and
wherein the performing encryption processing on the color value of each pixel based on the target obfuscation key, to obtain the encrypted color value of each pixel comprises:
starting from an $i^{th}$ pixel in the online streamer image picture, wherein i=1;
performing an exclusive OR operation on transparency of the $i^{th}$ pixel in the online streamer image picture and a value of a $(2i-1)^{th}$ bit in the target obfuscation key to obtain encrypted transparency of the $i^{th}$ pixel;
performing an exclusive OR operation on a chrominance value of the $i^{th}$ pixel in the online streamer image picture and a value of a $(2i)^{th}$ bit in the target obfuscation key to obtain an encrypted chrominance value of the $i^{th}$ pixel;
obtaining an encrypted color value of the $i^{th}$ pixel based on the encrypted transparency and the encrypted chrominance value of the $i^{th}$ pixel;
determining whether the $i^{th}$ pixel in the online streamer image picture is the last pixel; and
in response to determining that the $i^{th}$ pixel in the online streamer image picture is not the last pixel, increasing i by 1, and returning to the step of performing the exclusive OR operation on the transparency of the $i^{th}$ pixel in the online streamer image picture and the value of the $(2i-1)^{th}$ bit in the target obfuscation key.

5. The method according to claim 1, wherein the color value comprises transparency, a first chrominance value, a second chrominance value, and a third chrominance value; and
wherein the performing encryption processing on the color value of each pixel based on the target obfuscation key, to obtain the encrypted color value of each pixel comprise s:
starting from a $j^{th}$ pixel in the online streamer image picture, wherein j=1;
performing an exclusive OR operation on transparency of the $j^{th}$ pixel in the online streamer image picture and a value of a $(4j-3)^{th}$ bit in the target obfuscation key to obtain encrypted transparency of the $j^{th}$ pixel;
performing an exclusive OR operation on a first chrominance value of the $j^{th}$ pixel in the online streamer image picture and a value of a $(4j-2)^{th}$ bit in the target obfuscation key to obtain an encrypted first chrominance value of the $j^{th}$ pixel;
performing an exclusive OR operation on a second chrominance value of the $j^{th}$ pixel in the online streamer image picture and a value of a $(4j-1)^{th}$ bit in the target obfuscation key to obtain an encrypted second chrominance value of the $j^{th}$ pixel;
performing an exclusive OR operation on a third chrominance value of the $j^{th}$ pixel in the online streamer image picture and a value of a $(4j)^{th}$ bit in the target obfuscation key to obtain an encrypted third chrominance value of the $j^{th}$ pixel;
obtaining an encrypted color value of the $j^{th}$ pixel based on the encrypted transparency, the encrypted first chrominance value, the encrypted second chrominance value, and the encrypted third chrominance value of the $j^{th}$ pixel;
determining whether the $j^{th}$ pixel in the online streamer image picture is the last pixel; and
in response to determining that the $j^{th}$ pixel in the online streamer image picture is not the last pixel, increasing j by 1, and returning to the step of performing the exclusive OR operation on the transparency of the $j^{th}$ pixel in the online streamer image picture and the value of the $(4j-1)^{th}$ bit in the target obfuscation key.

6. A method, applied to a second online streamer end, the method comprising:

receiving an encrypted online streamer image picture and a target obfuscation key that are sent by a server, wherein the encrypted online streamer image picture is obtained by the sever by performing encryption processing on an online streamer image picture based on the target obfuscation key and picture information of the online streamer image picture sent by a first online streamer end, wherein the picture information comprises a color value of each pixel in the online streamer image picture, and performing the encryption processing on the online streamer image picture comprises:

performing encryption processing on the color value of each pixel based on the target obfuscation key, to obtain an encrypted color value of each pixel; and generating the encrypted online streamer image picture based on each encrypted color value;

generating, based on the target obfuscation key, a key picture corresponding to the encrypted online streamer image picture; and performing decryption processing on the encrypted online streamer image picture based on the key picture, to obtain the online streamer image picture.

7. A computing device, applied to a second online streamer end, the computing device comprising:

one or more processors;

a memory storing one or more programs configured to be executed by the one or more processors, the one or more programs comprising instructions for:

receiving an encrypted online streamer image picture and a target obfuscation key that are sent by a server, wherein the encrypted online streamer image picture is obtained by the server by performing encryption processing on an online streamer image picture based on the target obfuscation key and picture information of the online streamer image picture sent by a first online streamer end, wherein the picture information comprises a color value of each pixel in the online streamer image picture, and performing the encryption processing on the online streamer image picture comprises:

performing encryption processing on the color value of each pixel based on the target obfuscation key, to obtain an encrypted color value of each pixel; and generating the encrypted online streamer image picture based on each encrypted color value;

generating, based on the target obfuscation key, a key picture corresponding to the encrypted online streamer image picture; and performing decryption processing on the encrypted online streamer image picture based on the key picture, to obtain the online streamer image picture.

* * * * *